United States Patent
Robitaille et al.

(10) Patent No.: US 6,975,915 B2
(45) Date of Patent: Dec. 13, 2005

(54) COOPERATIVE SMART ITEMS

(75) Inventors: Bruno Robitaille, El Cajon, CA (US); Ming Xu, Dossenheim (DE); Philip Robinson, Durlach (DE); Stephan Haller, Karlsruhe (DE)

(73) Assignee: SAP AG, Walldorf (DE)

(*) Notice: Subject to any disclaimer, the term of this patent is extended or adjusted under 35 U.S.C. 154(b) by 156 days.

(21) Appl. No.: 10/284,468

(22) Filed: Oct. 31, 2002

(65) Prior Publication Data

US 2004/0088065 A1 May 6, 2004

(51) Int. Cl.⁷ .................................. G06F 19/00
(52) U.S. Cl. ..................... 700/108; 700/95; 700/99
(58) Field of Search ................. 700/108, 28, 173, 700/2, 20, 30, 31, 228–230, 95; 706/904

(56) References Cited

U.S. PATENT DOCUMENTS 6,347,253 B1  2/2002  Fujita et al.

OTHER PUBLICATIONS

Fletcher et al. "An open architecture for holonic cooperation and autonomy" Database and Expert system applications, 2000 Proceedings 11th international workshop on; pp. 224-230.*

Hammerle et al. "Internal communication architecture for resource holons" Systems, man, Cybernetics, 2000 IEEE Internationa conference, pp. 1721-1726.*

Balasubramanian, Sivaram et al., "An architecture for metamorphic control of holonic manufacturing systems," *Computers in Industry*, Aug. 2001, 46:13-31, XP004298794.

Fischer, Klaus, "Agent-based design of holonic manufacturing system," *Robotics and Autonomous Systems*, Apr. 1999, 27:3-13, XP004164315.

Lin, Shiming, et al., "Holonic Manufacturing System for Distribution Control of Automated Guided Vehicles," *Systems, Man, and Cubernetics: 2000 IEEE International Conference on Nashville, TN, USA*, Oct. 8, 2000, pp. 1727-1732, XP010524910.

* cited by examiner

*Primary Examiner*—Albert W. Paladini
*Assistant Examiner*—Steven R. Garland
(74) *Attorney, Agent, or Firm*—Fish & Richardson P.C.

(57) ABSTRACT

Manufacturing processes and related systems are disclosed which provide for fast, reliable, inexpensive production of customizable goods. Types of manufacturing equipment elements are individually equipped with various sensors and effecters, and associated with a software agent running on a dedicated processor. The elements may be made mobile, perhaps by placing the individual pieces of equipment on a movable trolley, and further equipped with a wireless transceiver. In this way, the elements may be easily assembled for a manufacturing process, with minimal human intervention required. Moreover, the elements may execute the steps of the manufacturing process in an autonomous, intelligent fashion.

40 Claims, 17 Drawing Sheets

COOPERATIVE SMART ITEMS

TECHNICAL FIELD

Disclosed implementations relate to an automated manufacturing process.

BACKGROUND

Conventional manufacturing systems exist for the production of goods. Many such manufacturing systems allow for mass production of goods in a timely, cost-effective manner. In order to produce goods in a timely, cost-effective manner, however, many conventional manufacturing systems rely on the fact that the goods being produced are identical or nearly identical. In other words, manufacturers often deliver products within a product line for which an associated manufacturing process has been designed and optimized. Due to the fact that such manufacturing processes are often large-scale (in order to be cost-effective on a per-item basis) and complex, it may be difficult for manufacturers to rapidly adapt to customers' changing product needs, particularly on a per-customer basis.

SUMMARY

In one general aspect, a physical condition is sensed at a first mobile production element, using a first sensor. The physical condition is communicated to a second mobile production element in a communication sent with a wireless transmitter, and a physical process is initiated at the second mobile production element, based on the communication.

When the physical condition is sensed, a response may be formulated to the physical condition based on a behavioral script associated with the first mobile production element. When the physical condition is communicated, the response may be included in the communication to the second mobile production element. Further, the behavioral script may be encoded in a software agent that is invoked by an output of the first sensor.

When initiating the physical process, the physical process may be determined based on a behavioral script associated with the second mobile production element.

A result of the physical process may be sensed at the second mobile production element, using a second sensor, and the result may be communicated to the first mobile production element.

Instructions may be input for completing a task, and performance of sub-tasks may be negotiated between the first mobile production element and the second mobile production element, using the wireless transmitter and based on a first behavioral script and a second behavioral script associated with the first mobile production element and the second mobile production element, respectively. Instructions for an assembling of the first mobile production element with respect to the second mobile production element may be output, where the assembling enables execution of the sub-tasks as divided between the first mobile production element and the second mobile production element. Further, inputting instructions may include communicating with a wired network at the first mobile production element.

The first mobile production element and the second mobile production elements may be holons within a holonic manufacturing system.

In communicating the physical condition, a Radio Frequency Identification tag associated with the second mobile production element may be identified.

In another general aspect, an assignment of tasks is negotiated between a plurality of production elements, each production element associated with a sensor, an effecter, a wireless transceiver, and a computer program governing behaviors of the associated production element, the tasks cumulatively defining a manufacturing process. An assigned one of the tasks is implemented at each of the production elements, based on the respective computer programs and utilizing the respective sensors and effecters. Status conditions of the tasks are communicated among the plurality of production elements using the respective wireless transceivers. The tasks are completed, based on the status conditions, to thereby complete the manufacturing process.

The production elements may be mobile. The computer program may be a software agent that is invoked by an input from the sensor, the effecter, or the wireless transceiver. The production elements may be holons within a holonic manufacturing system.

In negotiating the assignment, task instructions may be input from a database. Also, the task instructions may be communicated between the production elements, and individual ones of the tasks may be assigned to individual production elements based on the respective computer programs of the production elements. Alternatively, in negotiating the assignment, a software emulation of various task implementations by the production elements may be performed using an emulator associated with the database, and individual ones of the tasks may be assigned to individual production elements based on an optimization of the software emulation.

In communicating status conditions, the status conditions may be multicast from a first one of the production elements to at least two of the remaining production elements.

A group identifier may be assigned to all of the production elements. An individual identifier may also be assigned to each of the production elements, and communications between the production elements may be restricted based on the group identifier and the individual identifiers.

In communicating status conditions, the status conditions may be stored locally to a first production element, and updated status conditions may be periodically outputted to a centralized database. Further, a failure condition at the first production element may be detected, and an operation of the first production element may be restarted, after a repair of the failure condition, based on the updated status conditions.

In another general aspect, an apparatus may include a storage medium having instructions stored thereon. The instructions include a first code segment for inputting task instructions at a first mobile production element, where the first mobile production element is associated with a first computer program governing a first behavior pattern. The instructions also include a second code segment for detecting a physical condition using a sensing device associated with the first mobile production element. The instructions also include a third code segment for implementing a subset of the first behavior pattern at the first mobile production element, based on the first computer program, the first physical condition, and the task instructions. The instructions also include a fourth code segment for communicating a result of the subset to a second mobile production element.

The fourth code segment may communicate the result of the subset to the second mobile production element via a wireless transceiver. The third code segment may implement the first subset by outputting instructions to an actuator associated with the first mobile production element. The first computer program may be a software agent that is invoked by an input from the sensing device, the actuator, or the wireless transceiver.

When the fourth code segment communicates the result of the subset to the second mobile production element via a wireless transceiver, a fifth code segment may receive, via the wireless transceiver, a report of an action at the second mobile production element, the second mobile production element associated with a second computer program governing a second behavior pattern and operable to implement the action based on the result, the second behavior pattern, and the task instructions.

In another general aspect, a manufacturing system includes a plurality of mobile production elements working in concert to complete a process. Each mobile production element includes a sensor operable to detect a physical condition, an effecter operable to effect a physical task, a wireless transceiver operable to communicate with other mobile production elements, a processor operable to instruct physical implementation of a behavioral script by the effecter. The processor is further operable to communicate results of the implementation to at least one of the other mobile production elements using the wireless transceiver.

The behavioral script may be encoded in a software agent that is invoked by an output of the sensor.

The wireless transceiver may be further operable to receive task instructions from a control system. Further, The task instructions may be instructions for completing the process, and further the mobile production elements may negotiate among themselves, using their respective wireless transceivers and based on their respective behavioral scripts, to assign the task instructions. Alternatively, the task instructions may be a subset of instructions for completing the process, and further the task instructions may be determined by a software emulation of the process conducted at the control system.

The mobile production elements may be holons, and the manufacturing system may be a holonic manufacturing system.

A first one of the mobile production elements may include a memory operable to store a status condition of the implementation. Further, the first mobile production element may be operable to periodically transmit the status condition to an external database.

Still further, the first mobile production element further may include a failure detector operable to determine a failure of the implementation at the first mobile production element, based on an output of the sensor, and the processor may be operable to halt the implementation based on an output of the failure detector. In this case, the first mobile production element may resume the implementation based on the status condition.

Each mobile production element may also include a group identifier common to all of the mobile production elements, and an individual identifier assigned to the production element individually, wherein communications between the mobile production elements may be implemented based on the group identifier and the individual identifiers.

Each mobile production element may also include a radio-frequency identification tag for implementing the group identifier and the individual identifiers.

A first one of the mobile production elements may include an interface for interacting with an operator of the manufacturing system.

In another general aspect, a production control system may include a first production element associated with a first wireless transceiver, a first sensor, and a first effecter, as well as a second production element associated with a second wireless transceiver operable to communicate with the first wireless transceiver, a second sensor, and a second effecter, a first software agent associated with the first production element and operable to thereby monitor its local environment with the first sensor and act autonomously with the first effecter, based on its individual programming, a second software agent associated with the second production element and operable to thereby monitor its local environment with the second sensor and act autonomously with the second effecter, based on its individual programming, and a controller operable to communicate a task to the first production element for implementation by the first production element and the second production element.

The first production element may be mobile. The first production element and the second production elements may be holons, and the production control system may be a holonic control system.

The first production element and the second production element may communicate with one another via the first wireless transceiver and the second wireless transceiver, respectively, to thereby individually assume sub-tasks of the task based on their respective capabilities.

The first production element may communicate with the controller to receive a first sub-task task of the task and a second sub-task of the task for assignment to the first production element and the second production element, respectively.

The details of one or more implementations are set forth in the accompanying drawings and the description below. Other features will be apparent from the description and drawings, and from the claims.

DETAILED DESCRIPTION

Customers of manufactured goods generally prefer to have their respective orders produced quickly, inexpensively, and in a manner tailor-made to their individual needs. From a manufacturer's perspective, meeting customers' desired in this regard, particularly while continuing to produce a high-quality product, is often difficult or impossible to do.

Figure 1:
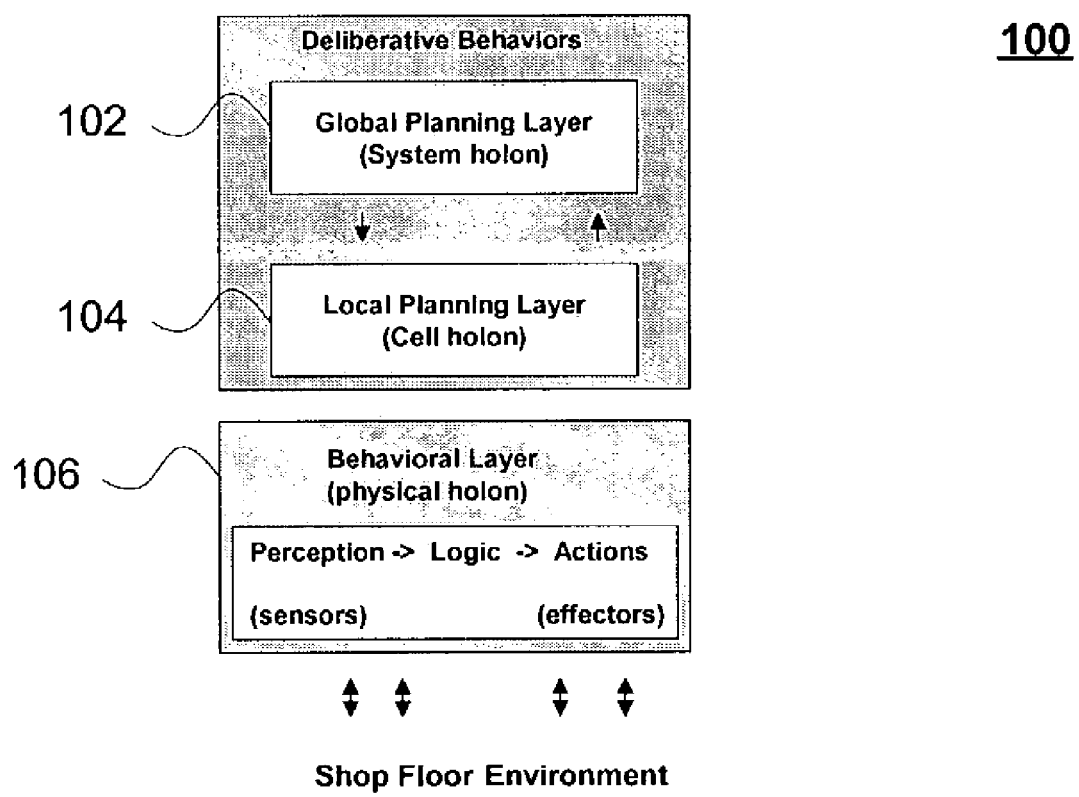
FIG. 1 is a block diagram of a holonic system.

FIG. 1 is a block diagram of a holonic system. A holonic system, or a Holonic Manufacturing System ("HMS") is a system architecture for manufacturing systems. An HMS is generally composed of different kinds of holons, which are autonomous, self-reliant manufacturing-related entities. A holon is an identifiable part of a manufacturing system that has a unique identity, yet is made up of sub-ordinate parts (also holons) and in turn is part of a larger whole (also a holon). For example, a manufacturing plant is composed of many manufacturing production units, which are, in turn, composed of machines, human operators and material handling devices. The manufacturing plant can be viewed as the larger whole (system holon), the manufacturing production units as sub-parts (cell holons), and the production resources as sub-parts (physical holons) of the cell holons.

In FIG. 1, a holonic system 100 includes a global planning layer or system holon 102 interacting with a local planning layer or cell holon 104. For example, system holon 102 might be an entire manufacturing plant, having many different production units 104. Thus, system holon 102 and cell holon 104 may communicate with one another to determine general planning and assignment of tasks within the system 100.

Cell holon 104 communicates with a physical holon 106, which may be an actual production resource such as a blending vessel, pallet, or numerous other examples discussed in more detail below. A physical holon 106 may have physical tools for interacting with the physical world, such as sensors and effecters, as well as logic for governing the use of these tools, particularly in interacting with other physical objects in a shop floor environment. Thus, patterns of behavior for physical holon 106 can be activated by either top layer holons 102 and 104 (top-down), or by external trigger conditions including physical sensors (bottom-up).

The system holon 102 and cell holon 104 may use a more deliberative approach in reasoning about what actions to take. This deliberation may rely heavily on a symbolic representation of the world in which they operate. Given this reliance on a model, such agents may be more suited for applications where the environment is well-structured and highly predictable (for example, global and local production planning). On the opposite end, the physical holon 106 may use a reactive approach, where perception and action are tightly coupled, to provide timely reactions based on direct input from the environment, including a dynamic and unstructured environment such as a production shop floor.

Figure 2:
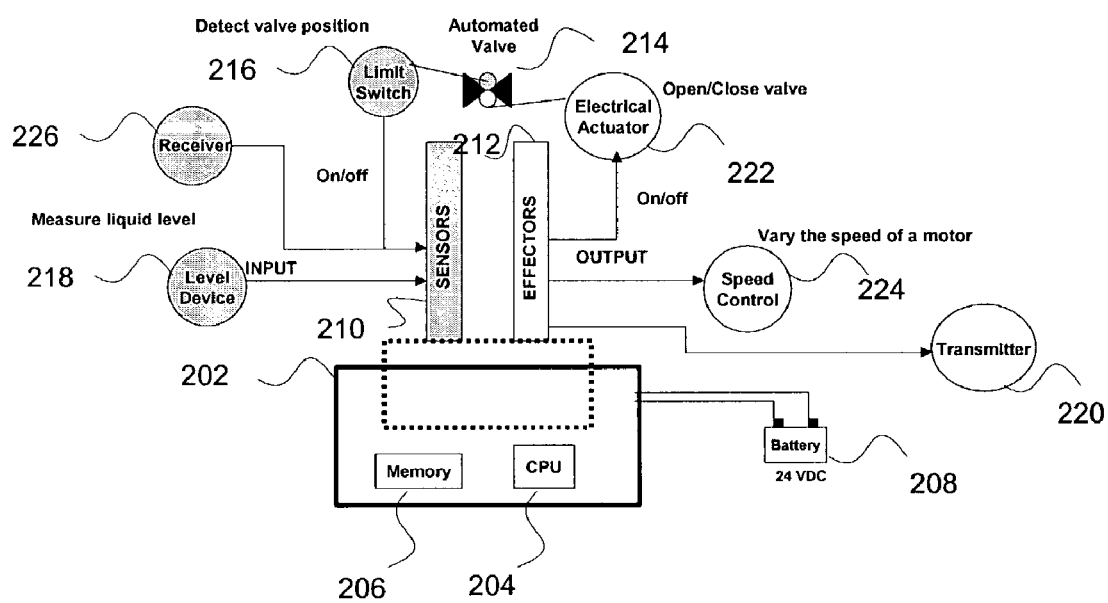
FIG. 2 is a block diagram of a holon.

FIG. 2 is a block diagram of a holon. More specifically, FIG. 2 is an example of a physical holon 106 of FIG. 1. In FIG. 2, a body 202 includes a CPU 204 and a memory area 206. Body 202 is connected to a battery 208 and a plurality of sensors 210 and effecters 212. Holon 106 in FIG. 2 is interacting with an automated valve 214. Thus, sensors 210 for sensing, e.g., movement, pressure, or heat may include a limit switch 216 and a fluid level device 218 for monitoring/maintaining a fluid level using valve 214. Holon 106 may also include a sensor such as a wireless receiver 220. Effectors 212, i.e., devices that produce a physical effect, may include an electrical actuator 222 for opening/closing valve 214, a speed control 224, and a wireless transmitter 226. Sensors 210 and effecters 212 may be hard-wired to a motherboard connected to CPU 204 and memory area 206.

Holon 106 may thus behave intelligently by virtue of its ability to process and react to information received from its environment, in the form of communication from other holons or sensory input. Holon 106 may thus exhibit various types of intelligent behavior, such as the ability for self-diagnosis of its sensors 210/effecters 212.

An operation of physical holons such as physical holon 106 is discussed in more detail below. However, from FIG. 2 it should be understood that holon 106 may be mobile (for example, on wheels for easy rolling and relocation) and/or attached to (mobile) automated valve 214. Also, CPU 204 and memory area 206 may be used to operate and store, for example, one or more software agents for governing a behavior(s) of holon 106.

In particular, such software agents may be used to govern inter-holon communication using transmitter 220 and receiver 226 for negotiation and coordination of the execution of processing plans (for example, sequences of manufacturing tasks) and recovery from abnormal operations. Tasks may include, for example, implementing real-time control functions that implement and monitor a required sequence of operations and/or a detection/diagnosis of malfunctions, or governing physical interfaces between control functions and the sensors 210 and effecters 212.

Although the term software agent may have various meanings and definitions in different environments, it can generally be thought of here as an active object with initiative. Specifically, what an agent does when it runs, as well as when the agent runs in the first place, may be governed by internal rules and goals. Thus, unlike other objects, such agents do not need to be invoked, but rather may constantly monitor their local environment(s) and act autonomously based on their individual programming.

To the extent that the systems of FIGS. 1 and 2 utilize distributed object applications in implementing the software agents and related holon operations, different services may be required to support these operations. Two examples of distributed object technologies which can be utilized in industrial frameworks, are Common Object Request Broker Architecture ("CORBA"™) and Windows Distributed interNet Applications for Manufacturing ("Windows-DNA"™, produced by Microsoft).

CORBA is a middleware design that allows application programs to communicate with one another irrespective of their programming languages, their hardware and software platform, the networks they communicate over and their implementors. Windows-DNA is a technical architecture that reduces costs and simplifies the process of deploying, integrating and managing systems for manufacturing enterprises. The architecture allows a wide range of manufacturing software applications to integrate seamlessly, enabling fast, easy information exchange among various Windows controllers and other systems.

Other agent platforms available commercially, such as "grasshopper," developed by the Object Management Group (OMG), may also be used as a basis for using object-oriented agents in a holonic manufacturing system.

Figure 3:
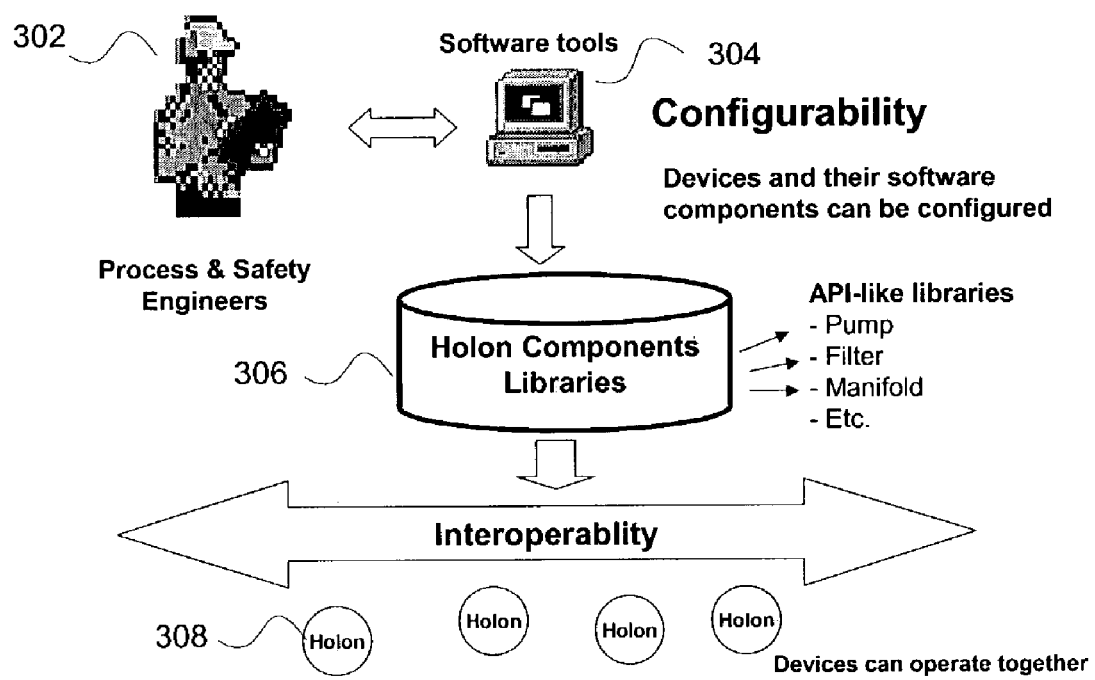
FIG. 3 is a block diagram of a holonic manufacturing system.

FIG. 3 is a block diagram of a holonic manufacturing system. In FIG. 3, process and safety engineers 302 collaborate to design, simulate, and test patterns of behavior for each category of holons (for example, pumps, filters, or manifolds), using software tools 304. Once the patterns of behavior for a specific category of holon are approved, they are stored as Application Program Interface ("API") or API-like libraries on a centralized database 306. Generally, only one valid version of the patterns may be available to download on the respective holon from among the various interoperable holons 308. For example, the experts 302 may work together to design the patterns of behavior for the pump category. The official version of patterns is made available on the database 306, where process engineers can access it using software tools 304. The process engineers 302 may thus retrieve the patterns of behavior for the pump and load them on a pump. The patterns of behavior downloaded on the pump may thus reside in the pump's memory until they are modified (i.e., updated, deleted). For safety and security reasons, the access to the database 306 may be restricted to authorized personal only.

Using centralized database 306 and related systems, it may be possible to model a manufacturing process prior to its implementation by the physical holons, using, for example, a code language such as Simulated Java or "simJava." That is, a software model can be constructed that is consistent with the various software agents of the physical holons, and the tasks of the physical holons can be assigned, implemented, and tested prior to downloading to the wireless network. Alternatively, the centralized database could simply download a simple work order, and leave it to the physical holons to negotiate among themselves as to which holons are necessary for implementing a task. Thus, there could be a library of standard tasks stored in the database for easy, reliable, downloading and use, whereas unanticipated or unusual tasks could be left for intra-holon assignment.

With the architecture described above with respect to FIGS. 1–3, an HMS may implement various advantageous features. For example, an HMS may exhibit autonomy in the capability of a manufacturing unit to create and control the execution of its own plans and/or strategies (and to maintain its own functions). The HMS may exhibit cooperation in that a set of holons (manufacturing units) may develop/negotiate mutually acceptable plans and execute them. Somewhat similarly, the HMS may exhibit self-organization in that the manufacturing units may collect and arrange themselves in order to achieve a production goal. As a final example, the HMS may exhibit reconfigurability, or the ability to alter a function of a manufacturing unit in a timely, simple, and cost effective manner.

Although some theory exists for the definition and use of holonic systems, for example in software or modeling environments, holonic systems have not been suitably applied to industrial frameworks, particularly at the level of the physical holon itself. For example, a concern for an HMS organization is how physical holons/resources can be organized dynamically during runtime of the HMS, as well as how associated controller components can be reconfigured dynamically.

In addition to implementing the object-oriented agent approach referred to above, one way for improving the dynamic organization and (re)configuration of holons in the system(s) of FIGS. 1–3 involves the use of wireless technology, such as might be implemented by wireless transmitter 220 and 226. In contrast to conventional, manually-operated production processes, wireless technology allows manufacturers to automate processes much more fully. Implementation of wireless technologies in production shop floors, however, is not without challenges, as this environment is very demanding in terms of, for example, robustness, reliability, security, and safety.

Figure 4:
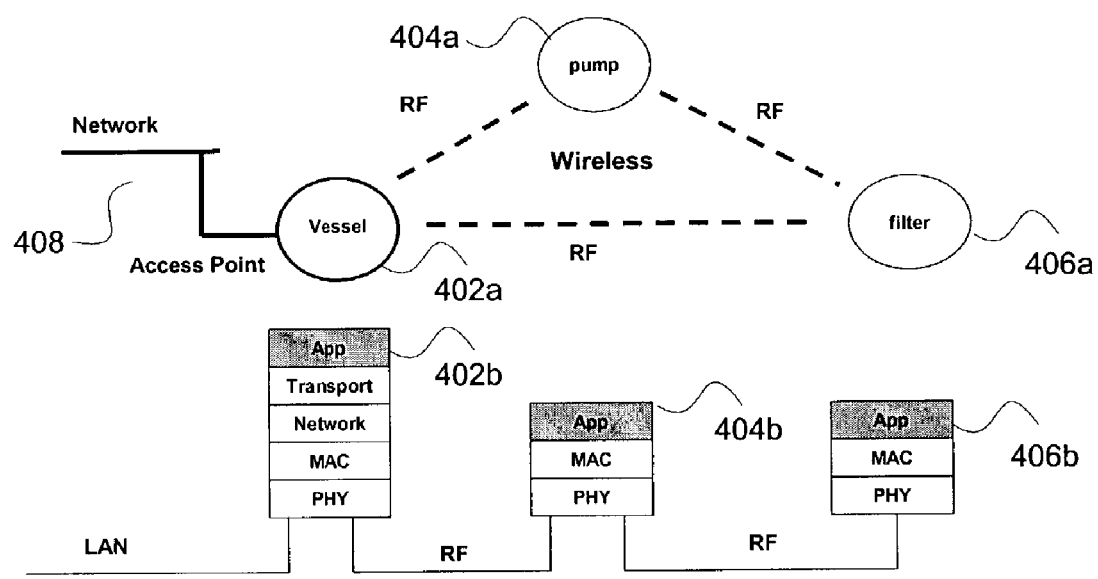
FIG. 4 is a block diagram of holonic manufacturing system elements having wireless and wired connections to one another and to a control network.

FIG. 4 is a block diagram of HMS elements having wireless and wired connections to one another and to a control network. In FIG. 4, a blending vessel holon 402*a* and its associated network layer model 402*b*, a pump holon 404*a* and its associated network layer model 404*b*, and filter holon 406*a* and its associated network layer model 406*b* all communicate using radio frequency ("RF") signals sent and received by transmitter 220 and receiver 226 (illustrated in FIG. 2). Transmitter 220 and receiver 226 may be incorporated into a single element, that is, a transceiver.

In FIG. 4, the blending vessel 402*a* provides an interface or access point between the cluster of wireless holons 402*a*, 404*a*, and 406*a* and an enterprise local area network (LAN) 408. Since holons cooperate together and form a group, multicast communications can be used to enhance reliable communication. Holons can use the medium access control (MAC) address of other holons as the destination address when sending messages to their group members.

Such use of wireless technology has various advantages. For example, use of a Wireless Local Area Network ("WLAN") can provide users with access to real-time information. WLAN can also improve a speed and simplicity of holon installation, eliminating the need to pull new cable when moving process equipment. Plant availability may be increased and equipment breakdown reduced, in that troubleshooting/repair time may be improved by constant monitoring of mobile equipment performance. Process variability may be reduced, inasmuch as wireless communication permits process automation of mobile equipment and eliminates (less predictable) manual operations. Process startup time can be reduced, since wireless technology allows a "plug-and-play" capability with respect to new or reconfigured holons being used. Plant safety and security may be improved, since wireless automated processes are more likely to have the ability to operate in an unattended mode. Government regulatory compliance can be eased (for example, in cases where toxic chemicals are being utilized), since holons can automatically create reliable records of production and maintenance activity and reduce/eliminate the labor and risk of error inherent in manual record keeping. As final examples of WLAN technology in the system(s) of FIGS. 1–4, costs can be measurably reduced, both in cost of production (e.g., less employees, particularly supervising employees no longer needed for an automated system) and cost of ownership (e.g., overall installation expenses and life-cycle costs can be significantly lower than a conventional wired network, especially in dynamic environments requiring frequent moves, add, and changes).

In addition to WLAN technology, another technique compatible with implementing wireless technologies is known as Radio-Frequency ID (RFID) tags, which are inexpensive and allow for a range of information storage and communication abilities in a wireless context. Similarly, bar-code technologies could also be utilized in the various implementations discussed herein. Moreover, various other techniques for wireless communication exist. For example, the "Bluetooth" specification is a frequency-hopping wireless communications standard operating in a commercially-available portion of the electromagnetic spectrum and available for use short-range, RF communications. Infrared wireless communications, using, for example, the Infrared Data Association ("IrDA") standard, may also be utilized.

Thus, the system(s) of FIGS. 1–4 demonstrate examples of manufacturing systems capable of interacting intelligently to organize for, and subsequently complete, a manufacturing process. Contributing factors to these intelligent interactions are the human-like decision-making capabilities introduced by the agents, as well as the ability to communicate among the holons using wireless transceivers.

Such systems, as demonstrated in more detail below, provide improved disturbance handling, flexibility, and availability then conventional manufacturing processes. The systems also allow for other advantages. For example, the systems allow a process to run at optimal or near-optimal speed, since lower safety margins are required in comparison to human-controlled processes.

The systems are generally distributed both physically and with respect to control, and control interactions are generally abstract and flexible, so that dependencies between system elements are minimized. Reduced dependencies imply, for example, a lack of assumptions about the internals of other elements or behavior, and allow for flexible and dynamic interactions between the elements. Control of the systems may be implemented in a reactive and pro-active fashion, to deal with unexpected disturbances and critical situations. Finally, the control may be self-organizing, with respect to initial set-up and subsequent disturbances.

Processes supported by such systems might be fairly simple or straight-forward. For example, it is often the case that two chemicals should not be stored next to one another, or that certain chemicals should not be stored in particular areas of a factory (such as areas exposed to high heat). In these cases, the chemicals may be stored on movable pallets equipped with various features from among those discussed above, so that if a human operator mistakenly co-locates locates two non-compatible sets of chemicals, the pallets (holons) themselves will detect this mistake and provide a warning and/or an instruction for movement to a proper location within the factory. Other examples exist for implementing the system(s) of FIGS. 1–4, as discussed in more detail below using the example(s) shown in FIGS. 5–17.

Figure 5:
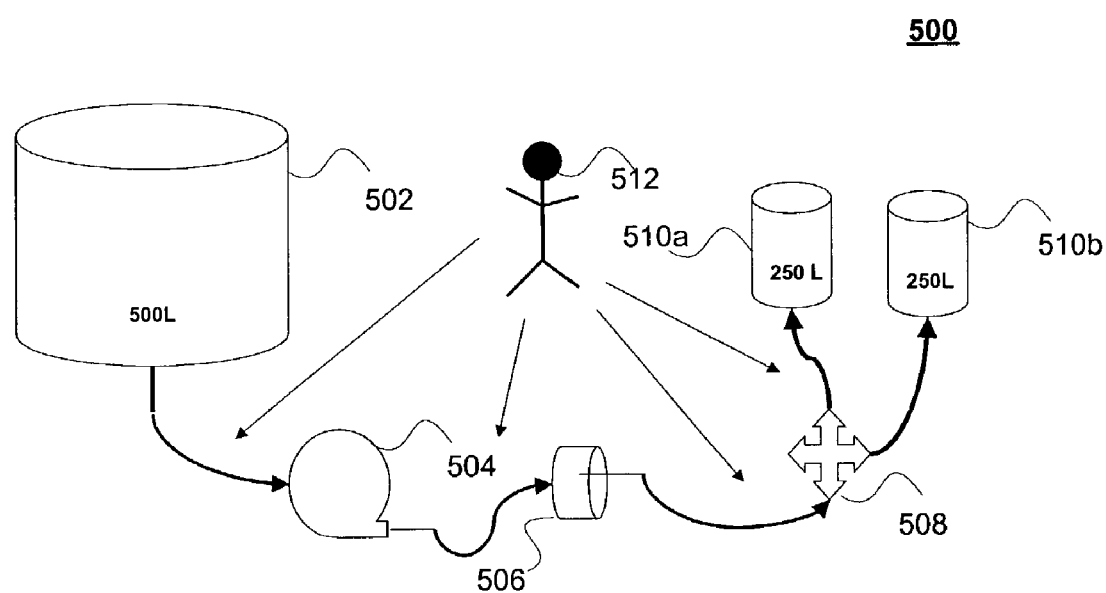
FIG. 5 is a block diagram of a manufacturing system for executing a manufacturing process.

FIG. 5 is a block diagram of a manufacturing system 500 for executing a manufacturing process. By way of background, it should be understood that, in the chemical process industry, the production unit where liquid products are produced is called "fabrication." The fabrication process can be summarized as follows: first, ingredients are added to a blending vessel, and different process equipment (e.g. agitator) are used to mix the solution; second, some production operations are conducted in the blending vessel until the final solution meets the required specifications (e.g. pH, temperature, viscosity, etc.); third, the product is transferred into portable tanks; fourth and finally, the product is brought to the next production unit to be packaged in bottles or tubes.

FIG. 5 describes, for the sake of example, the process of the third step, i.e., the transfer of the final product into portable tanks. In FIG. 5, then, a blending vessel 502 contains a final product solution that has already been blended. A pump 504 operates to remove the solution from the blending vessel 502, and to pump the solution into a filter 506. Filter 506 filters the solution as described in more detail below, and manifold 508 distributes the solution into a plurality of containers 510a and 510b. The various elements (holons) shown in FIG. 5 negotiate their roles in the process prior to beginning the process, and may be assigned (or assume for themselves) a group identifier ("ID") identifying themselves as members of a group working on this particular process. This groupID may be in addition to individual, unique identifiers the holons have for themselves, which may be embodied in, for example, radio-frequency ID ("RFID") tags.

In FIG. 5, it is assumed that all process equipment, except the blending vessel 502, are mobile (e.g., mounted on a trolley). As discussed above, the entities of FIG. 5 act as a group of holons in order to achieve their common goal of (cooperation) efficiently transferring the final solution from the blending vessel 502 to the portable tanks 510a and 510b. In the example of FIG. 5, it is shown that blending vessel 502 contains 500L of solution, and that portable tanks 510a and 510b each contain 250L. It should be understood, however, that, due to customer demand, some other amount of solution might need to be transferred to tanks 510a and 510b, and/or that more than two tanks might be needed (so that, for example, a different type of manifold might be required).

In the system 500 of FIG. 5, such changes and substitutions may be made quickly and easily, using the principles outlined above with respect to FIGS. 1–4. For example, the various production elements may negotiate with one another to achieve a desired goal (i.e., solution distribution). If blending vessel 502 is connected to a wired network as shown in FIG. 4 and receives an order for five 100L tanks to be filled, this order may be disseminated to the illustrated elements and to other elements, not shown. In this way, if manifold 508 is incapable of splitting the solution into five tanks, another manifold may be selected for replacing manifold 508. Similarly, three more tanks may realize they are needed and request attachment to the new manifold. A human operator 512 may, as described in more detail below, easily move and attach/remove various elements as needed, using the portable feature of the elements and simple flexible pipes. Instructions for such alterations, it should be understood, may be directly displayed to the operator 512 by one or more of the holons themselves, perhaps on a display screen attached to the holon(s). Thus, no high-level human supervision is required for operating the system 500 of FIG. 5, and customer needs may be met quickly, easily, and inexpensively.

Somewhat similarly, if filter 506 or other element breaks down or malfunctions, it may alert the rest of the system 500 virtually instantaneously, and thereafter be replaced or repaired. Also, one or more of the holons may continuously track an amount of the solution blended and dispensed, or may track other operations of the system 500. In this way, an operation of the system 500 may be easily tracked for, for example, easily proving compliance with government regulations (e.g., in the case where the solution is a toxic chemical or a pharmaceutical compound). Moreover, this tracking capability allows a current state of the system 500 to be continuously recorded, so that, in the event of a failure or other restart condition, a process may be easily resumed. These and other repair and reporting-related features are discussed in more detail below.

Thus, the holons of the system 500 may be said to behave intelligently, due to their ability to process and react to information they receive from their environment in the form of communication from other holons or directly from sensory input. A holon operates by using its "patterns of behavior" (internal logic) in concert with information received from external sources to reason about what actions to take, e.g., to conduct inter-holon communication or activate a specific effecter.

In FIG. 5, operator 512 is the only human actor. The operator 512 can act as an integrated element within a holon, or may assist the holon from outside. In the former case, the human can be regarded as a resource. In the latter case, people may be required only under exceptional conditions, e.g., diagnosis and repair.

The role of the operator 512 is, in the example of FIG. 5, primarily to act as an assistant. The operator 512 may assist the holons in carrying out operations such as bringing the equipment together and connecting them, or investigating equipment malfunctions. The operator 512 may also communicate with the holons to send a message such as "equipment installed."

The operator 512 may have some type of communication interface to communicate with the holons, such as a mobile handheld device used to read process status or operation instructions. The operator 512 may also be given the capability to override the holons' execution (e.g., manually operate some components for maintenance, emergency stops).

Figure 6:
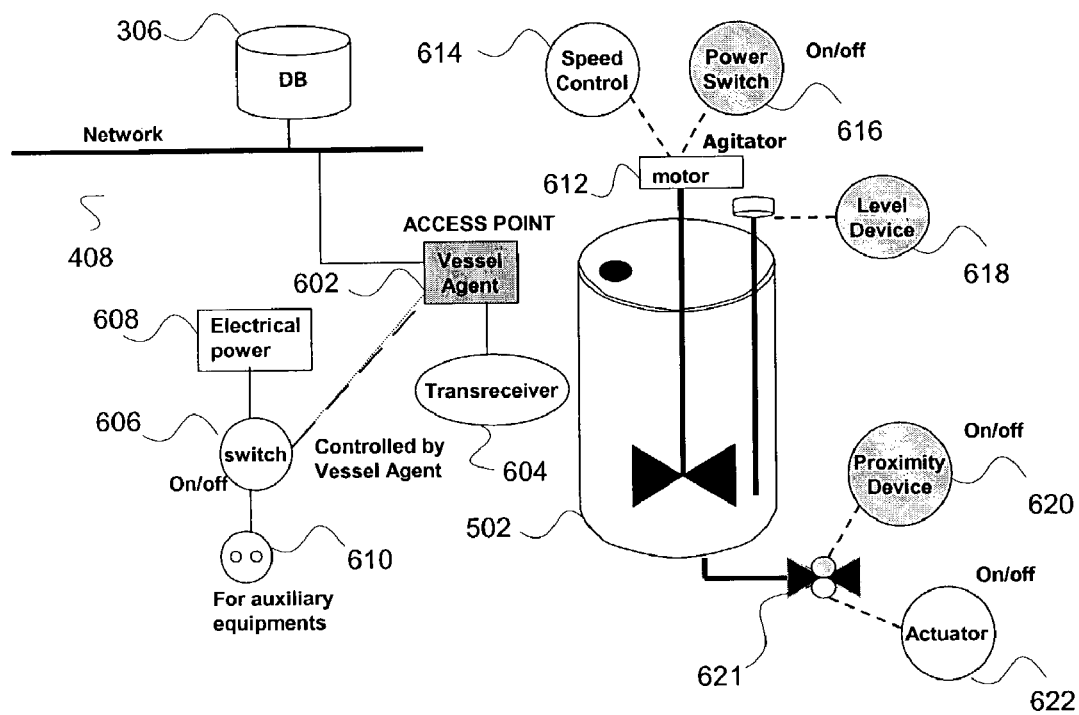
FIG. 6 is a block diagram of the blending vessel of FIG. 5.

FIG. 6 is a block diagram of the blending vessel 502 of FIG. 5. The blending vessel 502, as already referred to, interacts with the other holons to efficiently perform the transfer process. As shown in FIG. 4, it may also provide the access point to the wired network 408, and keep a log of the process status (for quick restart in case of system failure). As the access point to the wired network, it may update the records of production activities and/or get the groupID from a centralized database which may be database 306.

The behavior of blending vessel 502 is generally governed by an object-oriented software agent 602 associated with blending vessel 502. Agent 602 is connected to a wireless transceiver 604 for communicating with other holons, and is also connected via switch 606 to power source 608. In this way, agent 602 may decide, based on input from sensors as discussed below, whether to maintain or disrupt power to the blending vessel 502. Additionally, switch 606 allows agent 602 the option of providing power to auxiliary equipment, including the other holons within the system 500, via connection 610. In this way, a centralized point for interrupting a malfunction may be maintained.

A motor 612 serves to agitate the chemicals within blending vessel 502, and is controlled by a speed control system 614 and a local power switch 616. A level device 618 may be used to monitor a level of a fluid in blending vessel 502, and a proximity device 620 may be used to check a position of a valve 621. An actuator 622 may be used, perhaps in conjunction with proximity device 620, to open or close the valve 621, and thereby dispense the final solution from blending vessel 502.

Blending vessel 502 may also serve as a monitoring system for the entire system 500 that permits operation in unattended mode with a certain security level. That is, using sensors such as level device 618, effecters such as actuators 622, and logic such as is in agent 602, it may be possible to permit unattended operation of system 500, with the knowledge that the system 500 will be able to either correct or halt the blending process when problems occur. Also, although not shown, it should be clear that the various elements of FIG. 6 may all be connected to agent 602, so that agent 602 may implement its behavioral logic with respect to those devices. Moreover, some or all of the various elements may be subject to manual override, particularly in the case of an emergency.

Figure 7:
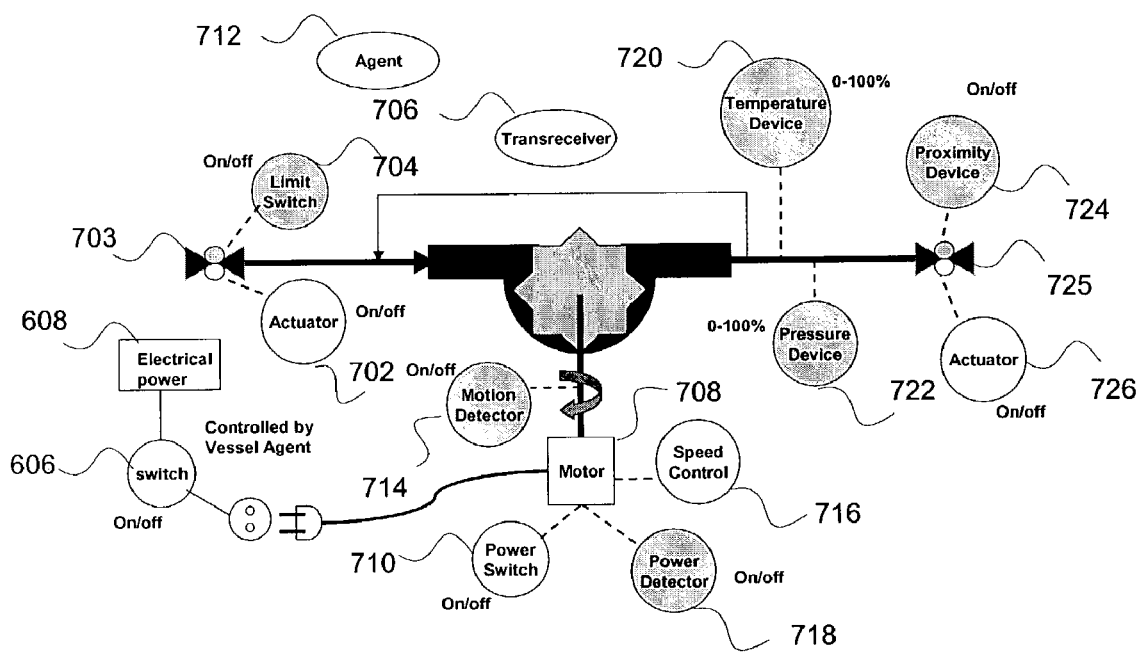
FIG. 7 is a block diagram of the pump of FIG. 5.

FIG. 7 is a block diagram of the pump 504 of FIG. 5. Pump 504 receives the solution from blending vessel 502 based on an operation of an actuator 702 and an associated limit switch 704, which may reduce or end the fluid flow through a valve 703 upon detection of a malfunction, such as an excessively fast flow. A transceiver 706 is available for communicating with the other holons, and a motor 708 serves to actually pump the solution from blending vessel 502 and into filter 506.

Motor 708 is subject to an operation of a local power switch 710, and receives power from power source 608 based on switch 606, as discussed with respect to FIG. 6. As with blending vessel 502, pump 504 is associated with various sensors and effecters for detecting and responding to local environmental conditions, based on a decision of a local agent 712. For example, a motion detector 714 may be used to monitor an operation of the pump 504. If the motion detector 714 provides data to a pump agent 712 that causes agent 712 to determine that pump 504 is operating too slowly or too quickly, then agent 712 may invoke a speed control device 716 to speed up or slow down the motor 708. A power detector 718 monitors a power level of motor 708, and feeds the resulting data to agent 712 for a determination as to whether the power is within acceptable levels, within a warning zone, or at a level which requires immediate interruption using switch 710. Similarly, a temperature device 720 (to be used, for example, to ensure sterilization) and a pressure device 722 monitor the temperature and pressure, respectively, of the fluid flow, and may be used in conjunction with agent 712 to interrupt or modify an operation of pump 504, as needed. Finally, as with blending vessel 502, a proximity device 724 may monitor a valve position of a valve 725 that is set by an actuator 726, for corresponding action as determined necessary by agent 712.

In pumping the solution, the pump 504 may, based on an operation of the agent 712, control a speed of the transfer or pumping process. In this example, the agent may have the directive that the solution should be pumped as quickly as is safely possible. As with the blending vessel 502, the sensors/effecters of pump 504 may serve as a monitoring system for repair and reporting of the operations of the pump 504. Also, it should be understood that portions of FIG. 7 not explicitly shown with respect to the blending vessel 502, such as the temperature/pressure sensors 720/722, may nonetheless be included with blending vessel 502, as needed.

Figure 8:
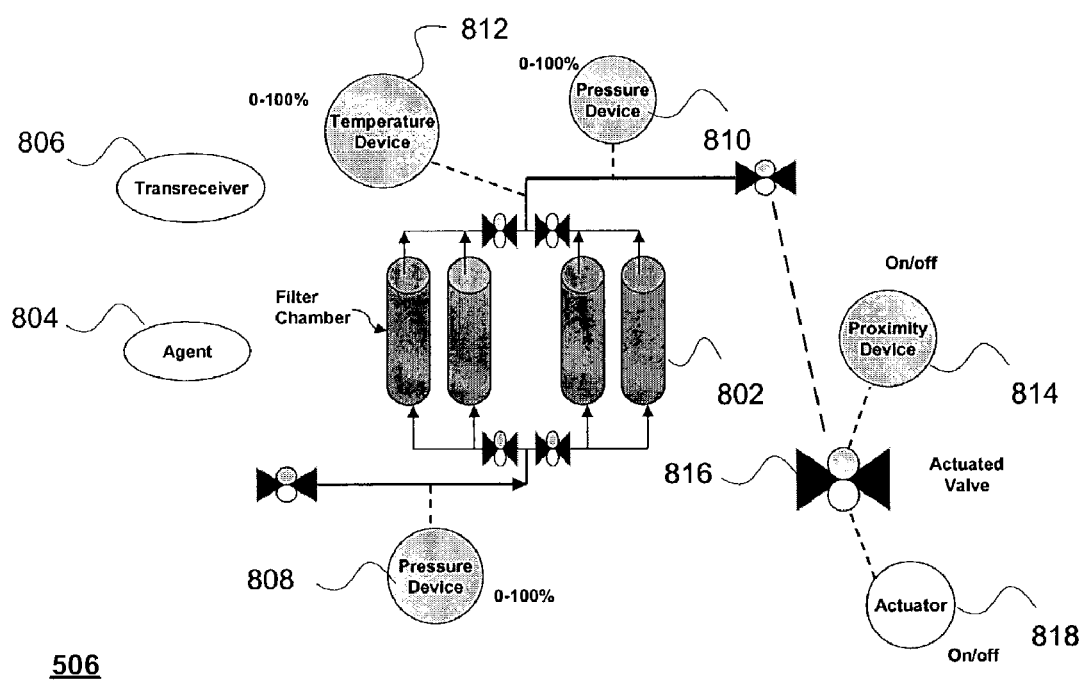
FIG. 8 is a block diagram of the filter of FIG. 5.

FIG. 8 is a block diagram of the filter 506 of FIG. 5. In FIG. 8, various filter chambers 802 filter the solution received from pump 504. An agent 804 determines a behavior of the various elements of filter 506, including that of transceiver 806, a pair of pressure sensors 808 and 810, and a temperature device 812. In particular, it should be understood that pressure sensors 808 and 810 may be used to determine a pressure differential at the input/output of filter 506. Finally, as with blending vessel 502 and pump 504, a proximity device 814 may be used to check a position of a valve 816, as set by an actuator 818. Although only one valve, proximity device, and actuator are labeled in FIG. 8, it should be understood that similar descriptions may be applied to all of the valves illustrated in FIG. 8.

As with blending vessel 502 and pump 504, an operation of filter 506 may be optimized by agent 804 and its interactions with the various available sensors and effecters. For example, it may be advantageous to optimize a useful life of filtering bags (not shown) in filter chambers 802, or generally to optimize the filtration process. As another example, the filter 506 may utilize the pressure differential calculated at sensors 808, 810 to alert various other holons that one or more of the filter bags has burst (resulting in an unrestricted fluid flow through the filter), as might be indicated by a sudden drop in the calculated pressure differential.

Figure 9:
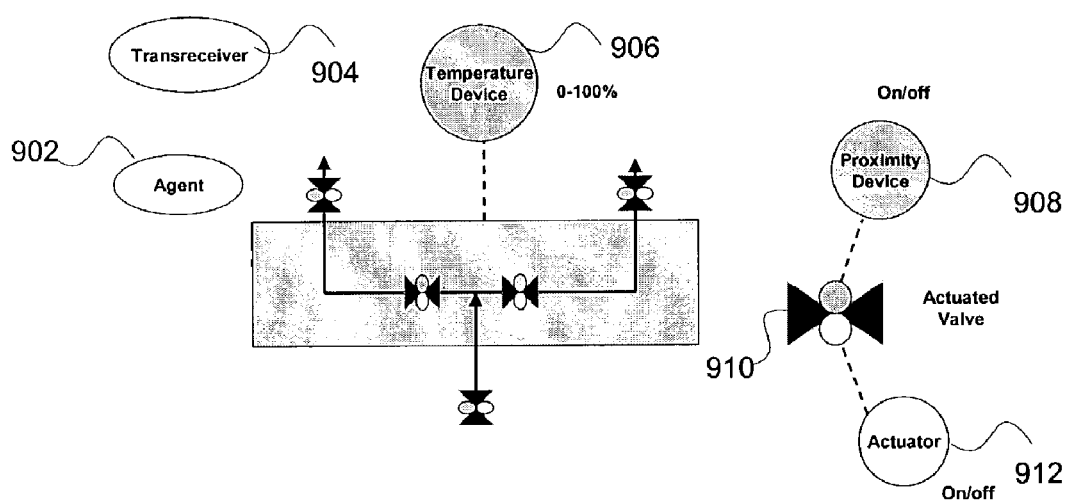
FIG. 9 is a block diagram of the manifold of FIG. 5.

FIG. 9 is a block diagram of the manifold of FIG. 5. As already discussed, manifold 508 serves to split a fluid flow of the solution from filter 506 from one stream into two. As with the holons already discussed, manifold 508 utilizes an agent 902 in managing a transceiver 904, a temperature sensor 906, and a proximity device 908 monitoring a position of a valve 910 set by an actuator 912. In particular, the manifold 508 may manage a sequence of filling the portable tanks 510a and 510b. This may include transferring the solution into the right tank at the right time, without significant production interruption. Depending on a production schedule, the manifold 508 can decide, for example, to fill the two tanks 510a/510b at the same time or one after the other.

Figure 10:
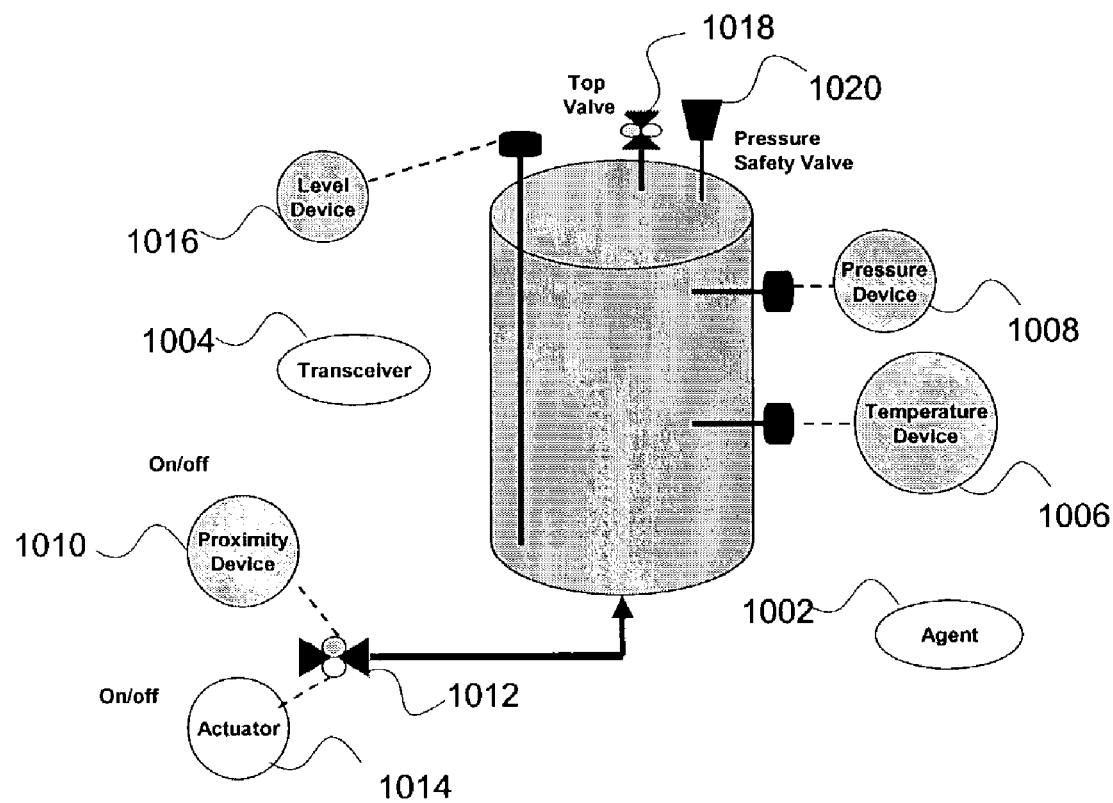
FIG. 10 is a block diagram of the portable tank of FIG. 5.

FIG. 10 is a block diagram of the portable tank of FIG. 5. Again, as with one or more of the holons already discussed, tank 510 utilizes an agent 1002 in managing a transceiver 1004, a temperature sensor 1006, a pressure sensor 1008, and a proximity device 1010 monitoring a position of a valve 1012 set by an actuator 1014. Moreover, tank 510 is associated with a level device 1016 for monitoring a level of solution within tank 510, a top valve assembly 1018, and a pressure safety valve 1020 which may be used to release pressure within the tank (as needed, as determined by agent 1002). Thus, the tank 510 may ensure that the tank is safely filled, and avoids overflow.

Having described the structure and general capabilities of the various holons of system 500, the behavior patterns of the holons, as dictated by their respective agents, are discussed in more detail below.

Figure 11:
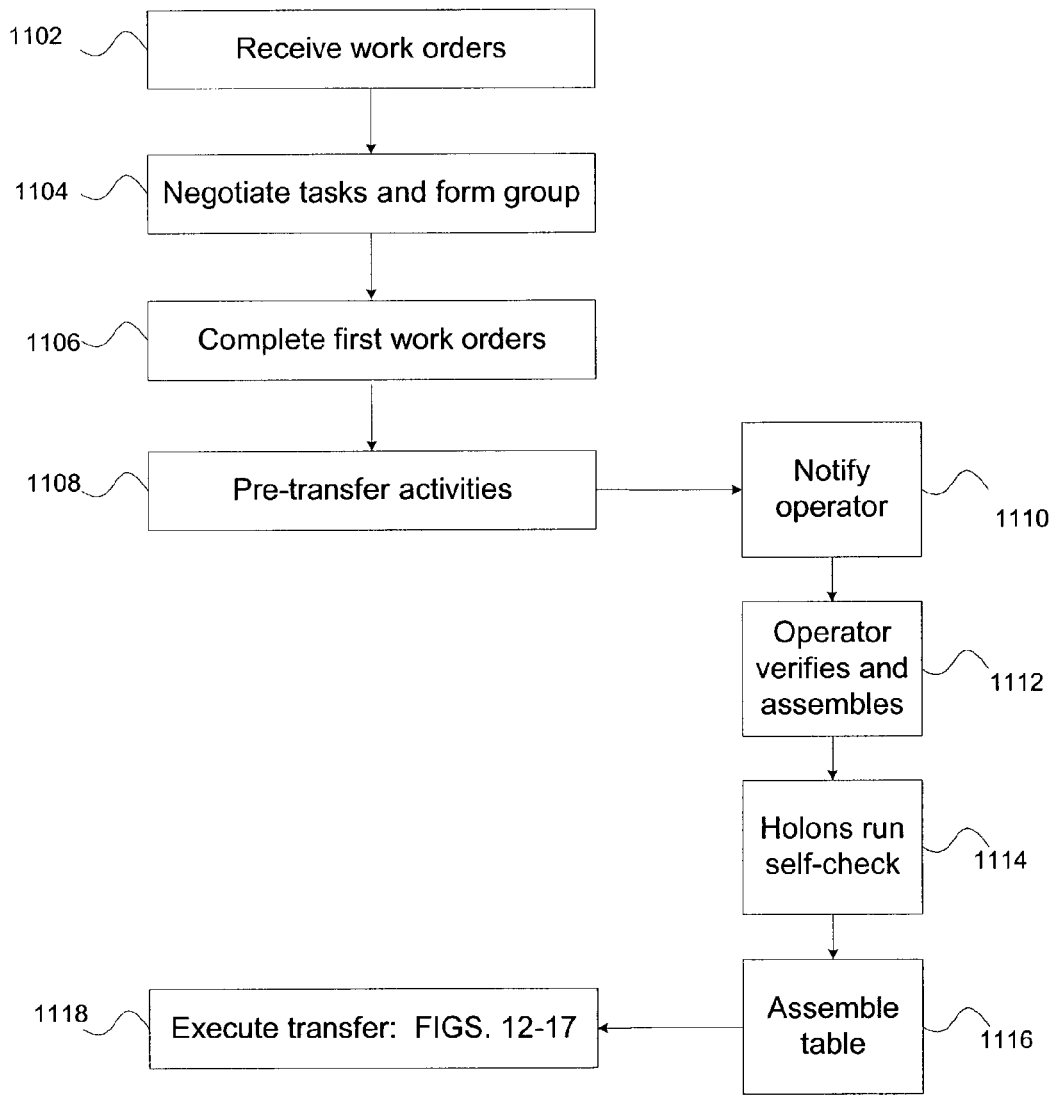
FIG. 11 is a flowchart illustrating an operation of a transfer process for a fluid solution.

FIG. 11 is a flowchart illustrating an operation 1100 of a transfer process for a fluid solution. In FIG. 11, blending vessel 502 receives work orders from a wired network (1102). These work orders, in the case of system 500, relate to the fabrication, transfer, and disposition of the fluid solution, as discussed herein. The blending vessel 502 may then determine which types of holons might be helpful or required for the various work orders, and how many of each are needed, and negotiates with those (types of) holons to form a group having a unique groupID of those holons which are available and capable for the tasks at hand (1104).

In this regard, it should be understood from the above discussion that specific production tasks are assigned to specific (groups of) holons. The HMS may provide a "group membership service" to dynamically manage membership. The role of such a group membership service could be to provide an interface for group membership changes (e.g., providing operations to add or withdraw members from a group such as replacing a defective pump with another pump), to implement a failure detector (in case of malfunction and/or communication failure), or to notify members of group membership changes (e.g., notifying the group's members when a new member is added, or when a member is excluded).

The blending vessel 502 then completes work orders which are set to completed first, e.g., here, the fabrication process is completed before the transfer process can begin (1106). Subsequently, blending vessel 502 initiates a pretransfer process (1108). It should be understood that, to improve the overall process flow, the pre-transfer processes may be performed simultaneously or overlapping with the completion of prior work orders.

During pre-transfer, the blending vessel 502 is the initiator of the process. That is, while still in the process of fabricating the solution, the blending vessel 502 notifies the operator 512 of the next task (i.e., transfer) to be performed (1110). In doing so, the blending vessel 502 sends to the operator 512 a list of holons to be put together (group members having a common groupID), the order in which they should be connected, and the operating instructions.

The operator 512 then brings the various holons together and connects them to each other with flexible pipes. The operator 512 can then plug pump 504 into an electrical power source (as prescribed by the operating instructions from blending vessel 502 and described above with respect to FIG. 7), and may then install new bags inside the filter's chamber. Once all the holons are prepared and installed, the operator 512 may inform the remaining holons, again via wireless transceiver, of this fact (1112).

Pump 504, upon receiving the message "installed," verifies that no alarms have been triggered by either its internal process (i.e., no malfunction of its sensors and effectors) and/or by abnormalities in the expected "patterns of behavior" (e.g. since the pump does not run, the pressure sensor should read "no pressure," if not, then something is wrong). Finally, if there is no alarm, the pump switches its state from "CLEANED" to "READY" (the "CLEANED" state is discussed in more detail below, with respect to the tank 510 in FIG. 17). Similarly, the filter 506, the manifold 508, and the two portable tanks 510a and 510b, switch their status to "READY" (again, assuming no alarm) (1114).

Subsequently, a group table may be assembled for each holon within the group, in order to help organize information about each member of the group. Such a table might include, for example, the groupID, the holonID, the holon name, the order number or other identifier, the process to be conducted (i.e., here, the transfer process), and the current status of each holon (e.g., "READY") (1116). Finally, the transfer process itself may begin, as described in more detail below with respect to FIGS. 12–17 (1118).

Figure 12:
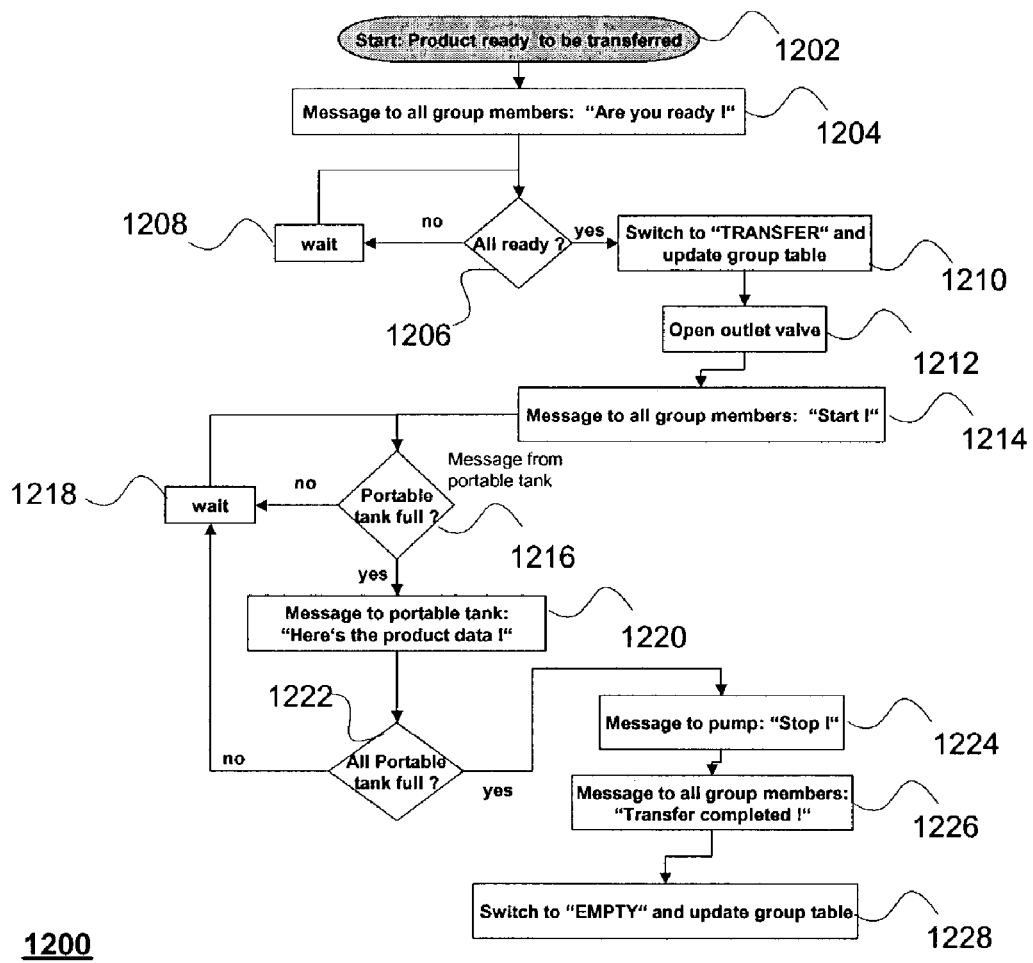
FIG. 12 is a flow chart illustrating an operation of the blending vessel of FIGS. 5 and 6.

FIG. 12 is a flow chart illustrating an operation 1200 of the blending vessel of FIGS. 5 and 6. In FIG. 12, the operation starts when the product solution is ready to be transferred (1202). The blending vessel 502 then sends a message to all group members, asking whether they are ready to begin the transfer (1204). If not all of the members are ready (1206), then the blending vessel 502 waits (1208) until they are, and then switches its own status from "READY" to "TRANSFER," updating the group table accordingly (1210).

Subsequently, the blending vessel 502 opens its outlet valve (1212) and sends a message to all group members to begin the transfer process (1214). The blending vessel 502 exchanges messages with portable tanks 510a to determine whether it is full (1216). If not, blending vessel 502 waits, i.e., continues the transfer process (1218). If the portable tank 510a is full, then the blending vessel 502 sends a message to the portable tank 510a providing data about the solution now contained within the portable tank 510a (1220).

The blending vessel 502 then checks to see whether all the portable tanks (e.g., here, the only remaining tank is tank 510b) (1222); if not, the blending vessel again waits some period of time (1218) before checking as to whether the next tank 510b is full (1216). If all the tanks 510 are full, then the blending vessel sends a message to the pump 504 to stop operations (1224), as well as a message to all of the group members that the transfer has been completed (1226). The blending vessel then switches its own status to "EMPTY" and updates the group table accordingly (1228).

Figure 13:
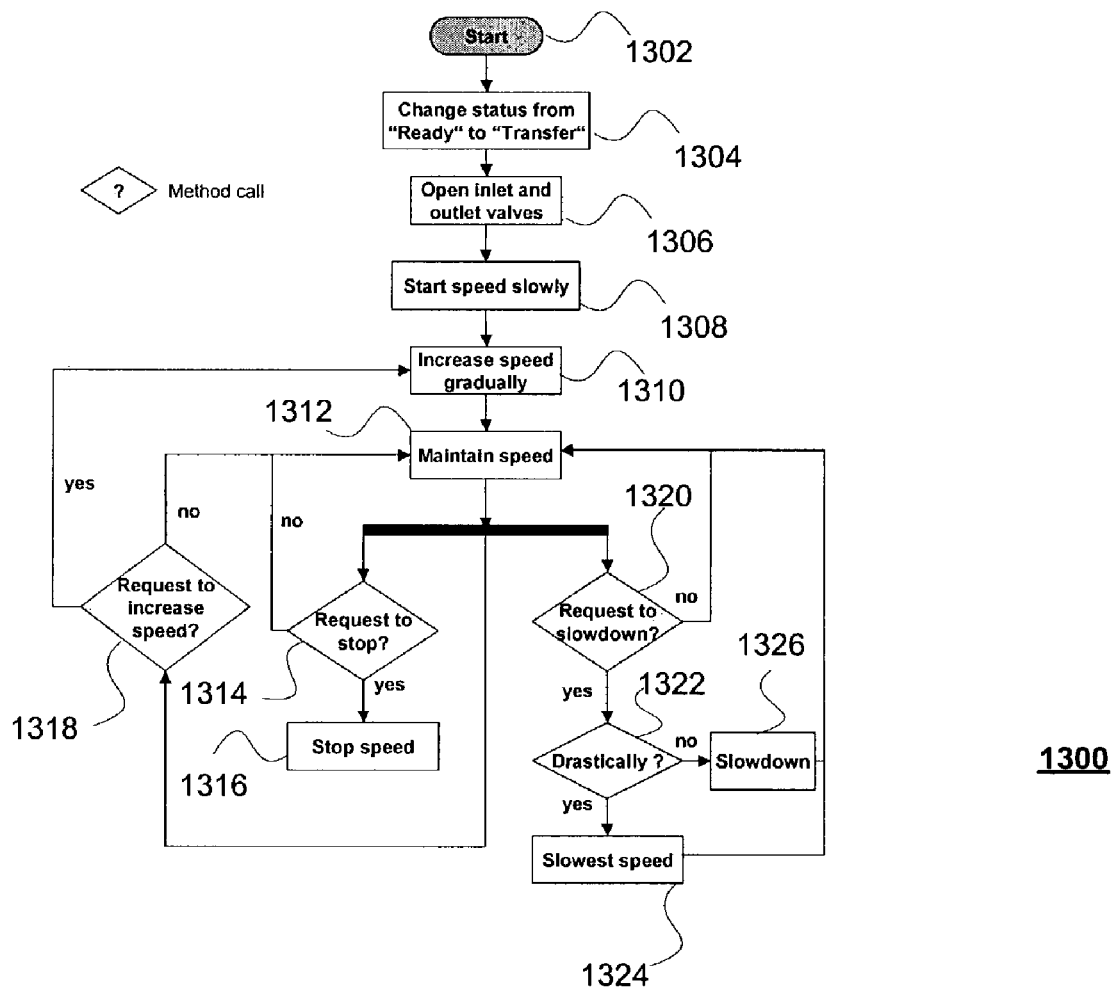
FIG. 13 is a flow chart illustrating an operation of the pump of FIGS. 5 and 7.

FIG. 13 is a flow chart illustrating an operation 1300 of the pump of FIGS. 5 and 7. In FIG. 13, the pump 504 starts the process (1302) by changing its status from "READY" to "TRANSFER" (1304). Inlet and outlet valves are then opened (1306), and the pump is initially started at a slow speed (1308). The speed is gradually increased (1310) to a pre-determined level, and then maintained (1312).

The transfer speed is maintained until a request is received from another holon. For example, a request to stop might be received (1314), in which case the pump may stop its operation entirely (1316). Such a request could be received, for example, in response to a system malfunction, or due to a completion of the transfer process. Alternatively, a request to increase speed might be received (1318), in which case the corresponding action will be taken (1310). As a third alternative, a request to slow the speed may be received (1320). This request may be checked to determine whether a drastic reduction in speed is required (1322); if so, then a slowest speed of the pump 504 may be immediately activated (1324). If not, then only a moderate slowdown may be implemented (1326).

Figure 14:
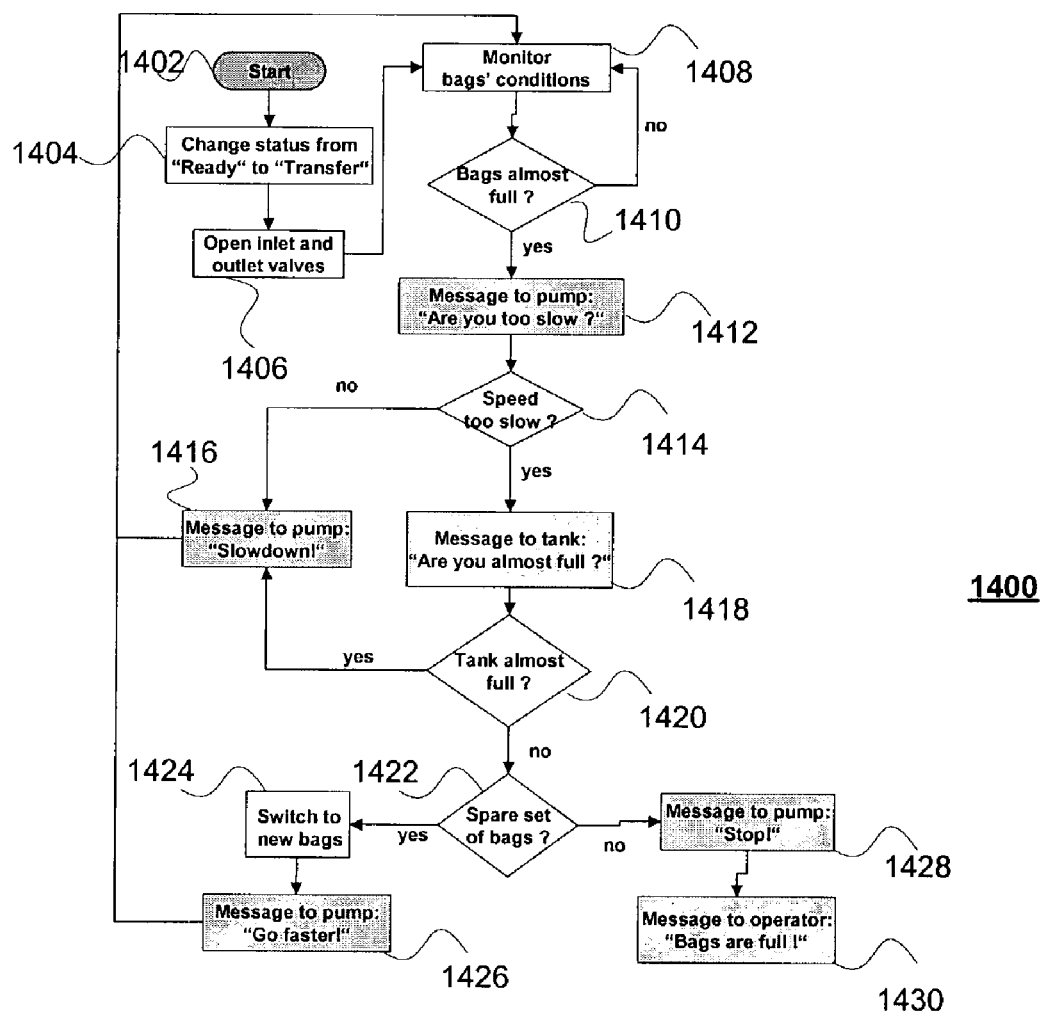
FIG. 14 is a flow chart illustrating an operation of the filter of FIGS. 5 and 8.

FIG. 14 is a flow chart illustrating an operation 1400 of the filter of FIGS. 5 and 8. In FIG. 14, it should be understood from FIG. 8 that a pressure differential through the filter bags within filter chambers 802, as measured by pressure-sensing devices 808 and 810, is used to monitor the bag conditions. More specifically, it should be understood that, during the transfer, undesired particles contained in the product are trapped in the bags. Over time, this accumulation will require more pumping "force" from pump 504 for the same liquid rate. This will be detected in the pressure differential, or the pumping energy lost through the filter. Accordingly, the filter 506 optimizes the usage of the bags by requesting the pump 504 to slowdown its speed when the pressure differential reaches an upper limit. However, it will switch to a new set of bags if the pump is already pumping too slowly. This is due to the trade-off between optimizing the useful life of the bags and the time required to transfer the product. This process are discussed in more detail with respect to FIG. 14.

In FIG. 14, then, the filter 506 starts the process (1402) by changing its status from "READY" to "TRANSFER" (1404). Inlet and outlet valves are then opened (1406), and the filter proceeds to monitor a condition of its filter bags within filter chambers 802 (1408).

If the bags are detected to be almost full (1410), then the filter 506 sends a message to the pump 504, asking the pump whether its speed is insufficient and/or sub-optimal (1412), and checks a response from pump 504 (1414). If the speed of the pump 504 is not too slow (i.e., it is too fast), then the filter 506 may send a message to the pump 504, telling it to reduce its speed (1416), and then continue to monitor its filter bags' conditions (1408). If the speed of the pump 504 is too slow, then the filter 506 sends a message to tank 510*a* to determine whether the tank 510*a* is almost full (1418). If the response from the tank 510*a* (1420) indicates that the tank 510*a* is, in fact, almost full, then filter 506 sends a message to the pump 504 to slowdown (1416). If the response indicates that the tank 510*a* is not almost full, then the filter checks to see whether a spare set of filter bags is needed and/or available for use (1422).

If a spare set of bags is needed and/or available, then the new set of bags is installed (1424), and, due to the corresponding improved pressure differential, a message may be sent to the pump 504 to increase its speed (1426). If no spare set of bags is needed and/or available, then the message may be sent to the pump 504 to stop its operations (1428), and a message may be sent to operator 512 that the bags are full (1430).

Figure 15:
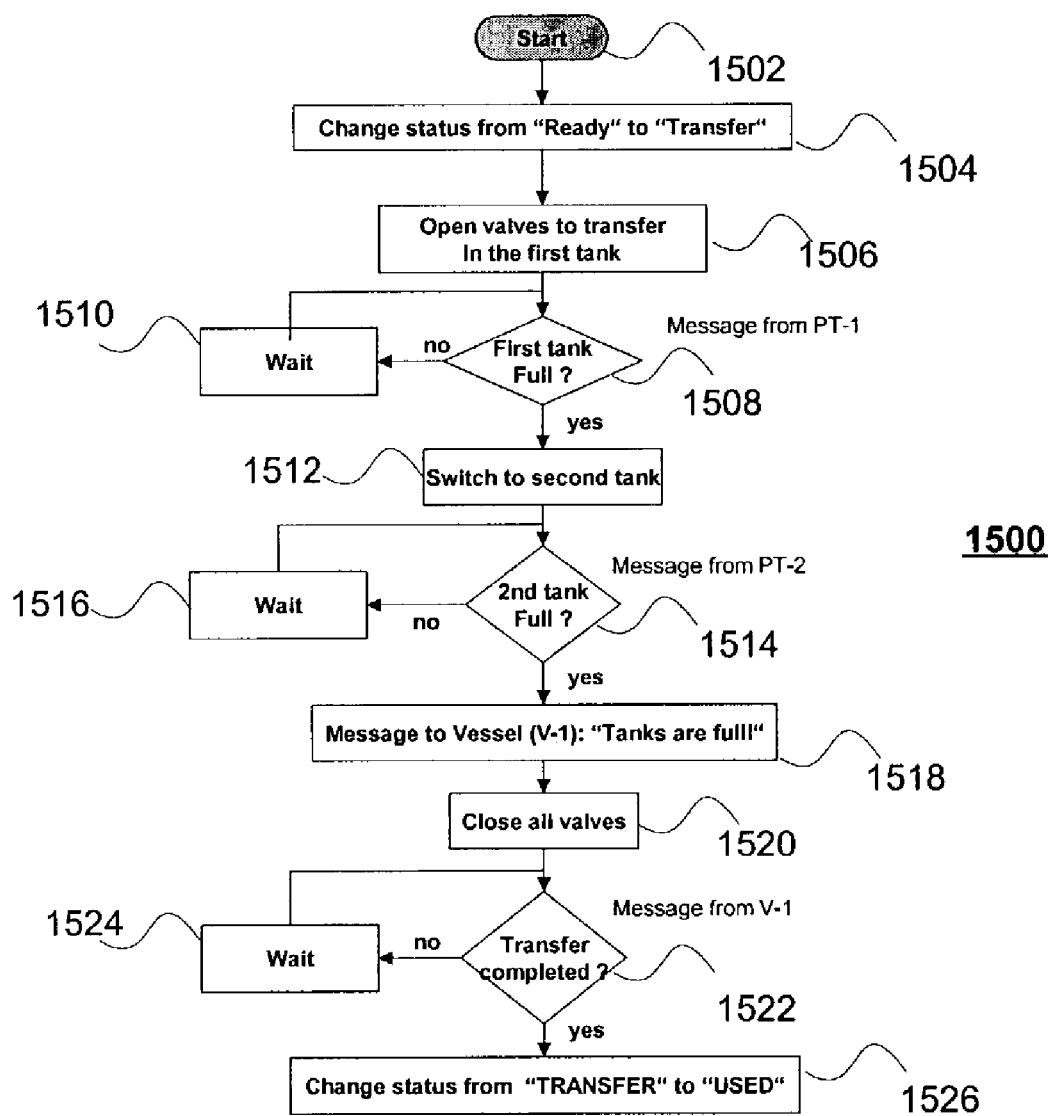
FIG. 15 is a flow chart illustrating an operation of the manifold of FIGS. 5 and 9.

FIG. 15 is a flow chart illustrating an operation 1500 of the manifold of FIGS. 5 and 9. In FIG. 15, the manifold 508 starts the process (1502) by changing its status from "READY" to "TRANSFER" (1504). Inlet and outlet valves are then opened, and the manifold 508 proceeds to transfer the solution into the first tank 510*a* (1506). The manifold 508 checks whether the first tank 510*a* is full by virtue of a message from the tank 510*a* (1508). If the tank 510*a* is not full, the manifold 508 continues to transfer the solution (1510). If the message indicates that the tank 510*a* is full, then the manifold 508 switches to the second tank 510*b* (1512).

Similarly, the manifold 508 checks to see whether the second tank 510*b* is full be receiving a message from that tank (1514). Again, if the tank 510*b* is not full, the manifold 508 waits while the transfer continues. If the second tank 510*b* is full, then the manifold 508 sends a message to the blending vessel 502 that all tanks are full (1518). If this is the case, then all valves of manifold 508 are closed (1520), and waits for a message from the blending vessel 502 that the transfer is complete (1522). If not, the manifold 508 will continue to wait (1524); if the transfer is completed, then the manifold 508 changes its status from "TRANSFER" to "USED" (1526).

Figure 16:
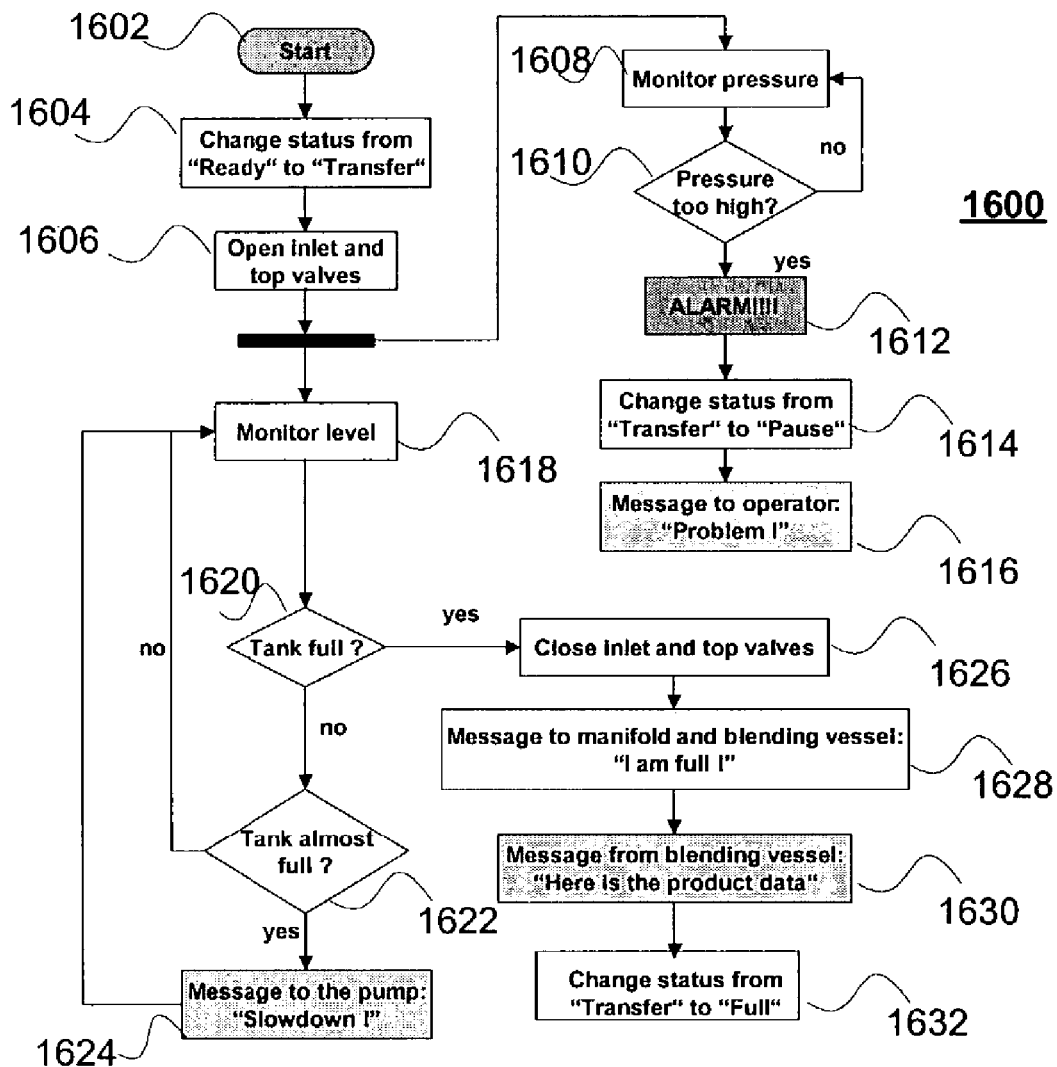
FIG. 16 is a flow chart illustrating an operation of the portable tank of FIGS. 5 and 10.

FIG. 16 is a flow chart illustrating an operation 1600 of the portable tank of FIGS. 5 and 10. In FIG. 16, the tank 510 starts the process (1602) by changing its status from "READY" to "TRANSFER" (1604). Inlet and outlet valves are then opened (1606), and the tank 510 proceeds to monitor a pressure of the fluid flow (1608). If the pressure is too high (1610), then the tank 510 sounds an alarm (1612), changes its status from "TRANSFER" to "PAUSE" (1614), and sends a message to the operator 512 informing the operator 512 of the problem (1616).

The tank 510 also monitors a fluid level within the tank 510 (1618). The tank 510 checks to see whether it is full (1620). If it is not full, then the tank 510 checks to see whether it is almost full (1622). If not, monitoring of the fluid level continues (1618); if so, then the tank 510 sends a message to the pump 504 to slowdown the transfer process (1624).

If the tank is full, then the inlet and top valves 1012 and 1018 are closed (1626), and the tank 510 sends a message to the manifold 508 and blending vessel 502 that it is full (1628). The tank may then receive a message from the blending vessel 502 indicating data about the product solution within the tank 510 (1630), whereupon the tank may change its status from "TRANSFER" to "FULL" (1632).

Figure 17:
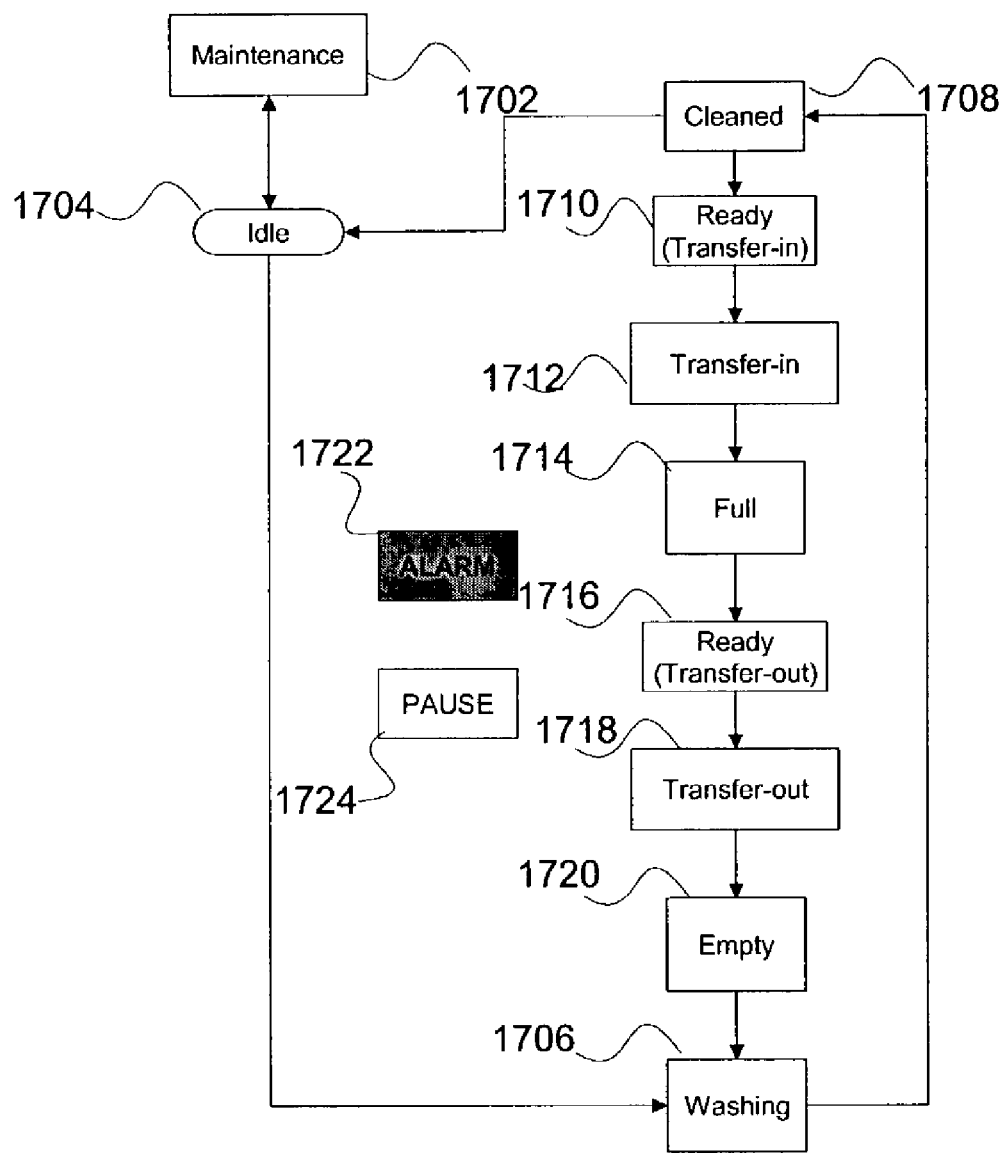
FIG. 17 is a flow chart illustrating an operation of states of the portable tank of FIGS. 5 and 10.

FIG. 17 is a flow chart illustrating an operation of states of the portable tank of FIGS. 5 and 10. In one state, the tank 510 has malfunctioned and is undergoing maintenance (1702). In another state, the tank 510 is currently idle (1704). If the tank remains idle for too long a period of time, it may become contaminated, and, to be readied for use, it may be put into a washing state (1706).

When the washing state has been completed, the tank 510 is in a cleaned ("CLEANED") state (1708). It should be understood that the holons themselves (in this case, the tank 510) will perform the check to determine that they are actually cleaned to the sanitary level required. Although the human operator 512 could perform this check, having the tank 510 do so removes this source of human error.

If the tank completes negotiations with the other holons, it may be put into a ready state with respect to that particular group, as already discussed (1710). In this way, a transfer-in state may be assumed (1712). Following a completion of the transfer-in state, the tank 510 may be in a full state (1714), and may be readied (1716) for a transfer-out state (1718). Another state of the tank 510 is the empty state (1720). At any point, if there is a problem, then a state of the tank 510 may switch to alarm (1722) and/or pause (1724).

Having described example operations and implementations in various contexts, the related concepts of robustness, reliability, safety, and security are discussed in more detail below, particularly with respect to implementations discussed using wireless transceivers for communication.

Robustness can generally be defined as an ability to recover from failure. The ability to recover quickly may be a critical factor in keeping a production schedule on time and respect product delivery schedules. In some cases, it can be very costly as the product may become "substandard" if it takes too long to restart production. In the implementations above, the autonomous holons are not generally supervised by production operators, so they should generally be able to restart and to "remember" what they were doing before the system 500 failed (e.g., which group they were, or which state they were in).

Fast recovery from failure can be provided by a "transaction service" monitor, which keeps reliable records of production activities. The transaction service monitor may keep track of the group activities and, in case of system failure, assist in the resumption of holon operation.

As referred to above, reliable records of production activities are part of regulation compliance in the pharmaceutical industry and other industries. In manually operated operations, creation of reliable records may be very difficult to establish or maintain. The transaction monitor can provide not only a solution to regulatory compliance but also to historical production data. A similar monitor can be used to generate production data. Historical production data are important in evaluating process performance, and are used, for example, to establish baselines, on which process improvements are compared. Similarly, records of maintenance activities can be automatically created.

Related to system robustness is system reliability. System reliability can be evaluated under two different aspects: equipment reliability and operational reliability. Equipment reliability refers to the hardware and devices that compose the holon, while operational reliability refers to how reliable the holons operate together to achieve their common goal.

As discussed above, holons are equipped with "smart" sensors and effectors that have the capability to detect their own malfunction (self-diagnosis). For example, if a sensor becomes defective, the holon (its operating system) may detect it. Depending on the criticality of the defective sensor, the holon may either change its state to "alarm" and stop operation, or keep operating but produce a "warning" signal. As for the hardware used to run the software, like the CPU and memory chip, they can be made for industrial applications, which are designed for harsh environments. The holon unit has at least a comparable reliability to equipment used in conventional control systems.

Additionally, one of the advantages that present implementations offer over conventional control systems is fault tolerance. For example, it is still possible to run a holon in "manual" mode in case of equipment failure, while conventional control systems must halt all processes if the computer that runs the main program crashes.

The use of wireless technology, as discussed above, is also relevant to system reliability. For example, if the portable tank 510 sends a message to the pump 504 to stop, but the pump 504 does not receive it, then the tank 510 could overfill. The message may not be delivered for various reasons, such as a defective transceiver, or a crash of the system of pump 504.

Since transmission failure can have serious consequences, the system may implement a mechanism to detect communication failure. For example, a failure detector may monitor the holons in case they should crash or become unreachable. This method of failure detection may utilize timeouts; that is, a method in which one process allows a fixed period of time for something to occur. The blending vessel 502 is a potential candidate to host the failure detector, and, particularly inasmuch as the blending vessel 502 may be a fixed piece of equipment, it may be easily equipped with the necessary tools to operate the failure detector (e.g., a database, redundant trans-receivers, etc.).

In system 500, a major safety issue comes from the pump 504, which is the only mobile holon in the example with "potential energy." When the portable tank 510 requests the pump to stop, the pump should stop immediately to avoid overfilling the tank 510. If the pump 504 is unreachable (communication failure), the system 500 should provide a way to stop the pump 504. Thus the blending vessel 502 may be used as a "watch dog," that passively listens to requests made to the pump 504 and intervenes by switching the pump power off if the pump 504 does not stop in due time. Also, the failure detector ensures that all holons are capable of communicating at all times, so that the watch dog functionality of the blending vessel 502 may be properly implemented.

Also with respect to reliability, the potential for excessive message latency when sending wireless communications should also be considered. In particular, synchronization and ordering of activities (coordination) may be disrupted by delays in receiving wireless communications. For example, if the portable tank 510 senses that it is full and sends a message requesting the pump 504 to slowdown, a delay in the message reception at the pump 504 may result, causing excessive fluid transfer to the tank 510. Such problems may be addressed using the transaction service monitor, failure detector, and/or watch dog service(s) described above.

Security is another issue for concern with respect to the implementations discussed with respect to FIGS. 1–17. In general, security risks include erroneous data downloaded on holons (data integrity), data falsified or deleted on holons (tampering and data integrity), unauthorized resources access confidential data (data confidentiality), and denial-of-service attacks.

With respect to data integrity, the right data should be downloaded to the right recipient. For example, the patterns of behavior intended for the class "pump" should not be loaded onto filter equipment. With respect to data tampering, no resource should be able to tamper with data on holons, either mistakenly or intentionally (i.e., sabotage). In the case of data confidentiality, unauthorized resources should not be allowed to access the confidential data of any holon. In the case of denial-of-service attacks, no resource should be permitted to take away expected services of a particular holon.

More particularly with respect to denial-of-service attacks, there are numerous possibilities for disrupting the implementations described above. For example, an attacker could increase a transfer latency; for example, ask the pump to slow down when this action is not necessary. An attacker could intentionally break key elements of the system by, for example, ask the pump 504 to speed up when this should not be allowed; such action could result in a broken filter bag, tank 510, or other element. An attacker could also stop the transfer before it is actually finished. As a final example, an attacker could transfer a product to a wrong location, for example, to a wrong holon or onto the floor.

Various techniques may be used to implement security procedures and avoid these potential problems. For example, authentication and authorization may be required before a user may access and/or update a holon or its behavior pattern(s). Careful distribution of the relevant holon and/or group identifiers (and a requirement of knowledge of these to perform certain functions) may also prevent security breaches. Also, the very nature of the adaptive, responsive, fault-tolerant structure described above is helpful in recovering if an attack or other security breach should take place.

With respect to authentication, existing authentication protocols cooperating with public key and symmetric cryptography may help ensure reliable authentication.

Protection of executable code (e.g., behavior patterns), a state of a holon, or actual collected results (data) may be achieved by a number of means. For example, if a code section is read-only, it can be secured using encryption protocols. With a digital signature, the modification of read-only section is generally detectable. Each holon can be granted authorization rights for particular resources, and logs and/or timestamps can be used to document improper behavior (for future prevention). A "code interpretation" technique may be used to enable each instruction within the code to be approved prior to its execution. Also, a "safe language," or one that is interpreted and complied with a special complier that ensures proper behavior, can be used.

Privacy, i.e., the privacy of interactions between items, can be ensure with the use of public-key and symmetric cryptography, private information retrieval, identity escrow, pseudonyms and/or anonymous mailers. Also, expected behavior from holons during an exchange can be used as a match to ensure that the actual information received during an exchange corresponds to what was agreed upon prior to the exchange.

As mentioned above, RFID tags may be used to identify elements and provide additional information about the elements. RFID tags vary greatly in their ability to store and/or manipulate data, operating distances, and other operational variables. Security can either be implemented at a level of the tag itself (e.g., a "lock" placed on the tag by the manufacturer to prevent alterations to the data), or can be implemented at an application level, using various encryption or other techniques.

In conclusion, techniques for implementing manufacturing processes have been disclosed. The processes allow for fast, reliable, secure, and customizable production of goods by implementing a HMS having holons equipped with object-oriented software agents and wireless transceivers, which operate in conjunction with various sensors and effecters at each holon to react intelligently to environmental and operational conditions. In this way, holons may interact with one another to achieve a desired result.

As a result of the holons' autonomous, decentralized, modular, and cooperative behavior, as described herein, goods can be produced according to whatever current needs a customer may have, without incurring excessive time/financial costs associated with a reconfiguration of the manufacturing system.

A number of implementations have been described. Nevertheless, it will be understood that various modifications may be made. Accordingly, other implementations are within the scope of the following claims.

What is claimed is:

1. A manufacturing method comprising:
   sensing a physical condition at a first mobile production element, using a first sensor;
   communicating the physical condition to a second mobile production element in a communication sent with a wireless transmitter, wherein communicating the physical condition comprises identifying a Radio Frequency Identification tag associated with the second mobile production element; and
   initiating a physical process at the second mobile production element based on the communication.

2. The method of claim 1 wherein sensing the physical condition comprises formulating a response to the physical condition based on a behavioral script associated with the first mobile production element, and further wherein communicating the physical condition comprises including the response to the second mobile production element in the communication.

3. The method of claim 2 wherein the behavioral script is encoded in a software agent that is invoked by an output of the first sensor.

4. The method of claim 1 wherein initiating the physical process comprises determining the physical process based on a behavioral script associated with the second mobile production element.

5. The method of claim 1, further comprising:
   sensing a result of the physical process at the second mobile production element, using a second sensor; and
   communicating the result to the first mobile production element.

6. The method of claim 1, further comprising:
   inputting instructions for completing a task;
   negotiating performance of sub-tasks between the first mobile production element and the second mobile production element, using the wireless transmitter and based on a first behavioral script and a second behavioral script associated with the first mobile production element and the second mobile production element, respectively; and
   outputting instructions for an assembling of the first mobile production element with respect to the second mobile production element, the assembling enabling execution of the sub-tasks as divided between the first mobile production element and the second mobile production element.

7. The method of claim 6, wherein inputting instructions comprises communicating with a wired network at the first mobile production element.

8. The method of claim 1, wherein the first mobile production element and the second mobile production elements are holons within a holonic manufacturing system.

9. A manufacturing method, the method comprising:
   negotiating an assignment of tasks between a plurality of production elements, each production element associated with a sensor, an effecter, a wireless transceiver, and a computer program governing behaviors of the associated production element, the tasks cumulatively defining a manufacturing process;
   implementing an assigned one of the tasks at each of the production elements, based on the respective computer programs and utilizing the respective sensors and effecters;
   communicating status conditions of the tasks among the plurality of production elements using the respective wireless transceivers, wherein communicating status conditions comprises:
      storing the status conditions locally to a first production element; and
      outputting, periodically, updated status conditions to a centralized database; and
   completing the tasks, based on the status conditions, to thereby complete the manufacturing process.

10. The method of claim 9 wherein the production elements are mobile.

11. The method of claim 9 wherein the computer program is a software agent that is invoked by an input from the sensor, the effecter, or the wireless transceiver.

12. The method of claim 9 wherein the production elements are holons within a holonic manufacturing system.

13. The method of claim 9 wherein negotiating the assignment comprises inputting task instructions from a database.

14. The method of claim 13 wherein negotiating the assignment comprises:
communicating the task instructions between the production elements; and
assigning individual ones of the tasks to individual production elements based on the respective computer programs of the production elements.

15. The method of claim 9 wherein negotiating the assignment comprises:
performing a software emulation of various task implementations by the production elements using an emulator; and
assigning individual ones of the tasks to individual production elements based on an optimization of the software emulation.

16. The method of claim 9 wherein communicating status conditions comprises multi-casting the status conditions from a first one of the production elements to at least two of the remaining production elements.

17. The method of claim 9, further comprising:
assigning a group identifier to all of the production elements;
assigning an individual identifier to each of the production elements; and
restricting communications between the production elements based on the group identifier and the individual identifiers.

18. The method of claim 9 further comprising:
detecting a failure condition at the first production element; and
restarting an operation of the first production element, after a repair of the failure condition, based on the updated status conditions.

19. The method of claim 9 wherein each of the status conditions is based on an output of a sensor and the output comprises a physical condition that relates to a material that is processed in the manufacturing process.

20. An apparatus comprising a computer readable storage medium having instructions stored thereon, the instructions including:
a first code segment for inputting task instructions, for a task in a manufacturing process, at a first mobile production element, the first mobile production element associated with a first computer program governing a first behavior pattern;
a second code segment for detecting a physical condition using a sensing device associated with the first mobile production element, the physical condition relating to a material that is processed in the manufacturing process;
a third code segment for implementing a subset of the first behavior pattern at the first mobile production element, based on the first computer program, the physical condition, and the task instructions; and
a fourth code segment for communicating a result of the subset to a second mobile production element.

21. The apparatus of claim 20 wherein the fourth code segment communicates the result of the subset to the second mobile production element via a wireless transceiver.

22. The apparatus of claim 21 wherein the third code segment implements the subset by outputting instructions to an actuator associated with the first mobile production element.

23. The apparatus of claim 22 wherein the first computer program is a software agent that is invoked by an input from the sensing device, the actuator, or the wireless transceiver.

24. The apparatus of claim 21 further comprising a fifth code segment for receiving, via the wireless transceiver, a report of an action at the second mobile production element, the second mobile production element associated with a second computer program governing a second behavior pattern and operable to implement the action based on the result, the second behavior pattern, and the task instructions.

25. A manufacturing system, the system comprising:
a plurality of mobile production elements working in concert to complete a process, each mobile production element further comprising:
a sensor operable to detect a physical condition;
an effecter operable to effect a physical task;
a wireless transceiver operable to communicate with other mobile production elements; and
a processor operable to instruct physical implementation of a behavioral script by the effecter, and further operable to communicate results of the implementation to at least one of the other mobile production elements using the wireless transceiver,
wherein a first mobile production element comprises a memory operable to store a status condition of the implementation, and the first mobile production element is operable to periodically transmit the status condition to an external database.

26. The system of claim 25 wherein the behavioral script is encoded in a software agent that is invoked by an output of the sensor.

27. The system of claim 25 wherein the wireless transceiver is further operable to receive task instructions from a control system.

28. The system of claim 27 wherein the task instructions are instructions for completing the process, and further wherein the mobile production elements negotiate among themselves, using their respective wireless transceivers and based on their respective behavioral scripts, to assign the task instructions.

29. The system of claim 27 wherein the task instructions are a subset of instructions for completing the process, and further wherein the task instructions are determined by a software emulation of the process conducted at the control system.

30. The system of claim 25 wherein the mobile production elements are holons and the manufacturing system is a holonic manufacturing system.

31. The system of claim 25 wherein the first mobile production element further comprises a failure detector operable to determine a failure of the implementation at the first mobile production element, based on an output of the sensor, and further wherein the processor is operable to halt the implementation based on an output of the failure detector.

32. The system of claim 31 wherein the first mobile production element resumes the implementation based on the status condition.

33. The system of claim 25 wherein each mobile production element further comprises:
a group identifier common to all of the mobile production elements; and
an individual identifier assigned to the production element individually,
wherein communications between the mobile production elements are implemented based on the group identifier and the individual identifiers.

34. The system of claim 33 wherein each mobile production element comprises a radio-frequency identification tag for implementing the group identifier and the individual identifiers.

35. The system of claim 25 wherein a first one of the mobile production elements comprises an interface for interacting with an operator of the manufacturing system.

36. A manufacturing method comprising:
sensing a physical condition at a first mobile production element, using a first sensor, wherein the physical condition comprises a physical condition relating to a material that is processed in the manufacturing method;
communicating the physical condition to a second mobile production element in a communication sent with a wireless transmitter; and
initiating a physical process at the second mobile production element based on the communication.

37. The method of claim 36 wherein the physical condition is selected from a group consisting of movement, pressure, and heat.

38. A manufacturing method, the method comprising:
negotiating an assignment of tasks between a plurality of production elements, each production element associated with a sensor, an effecter, a wireless transceiver, and a computer program governing behaviors of the associated production element, the tasks cumulatively defining a manufacturing process;
implementing an assigned one of the tasks at each of the production elements, based on the respective computer programs and utilizing the respective sensors and effecters;
communicating status conditions of the tasks among the plurality of production elements using the respective wireless transceivers;
completing the tasks, based on the status conditions, to thereby complete the manufacturing process;
assigning a group identifier to all of the production elements;
assigning an individual identifier to each of the production elements; and
restricting communications between the production elements based on the group identifier and the individual identifiers.

39. A manufacturing system, the system comprising:
a plurality of mobile production elements working in concert to complete a process, each mobile production element further comprising:
a sensor operable to detect a physical condition;
an effecter operable to effect a physical task;
a wireless transceiver operable to communicate with other mobile production elements; and
a processor operable to instruct physical implementation of a behavioral script by the effecter, and further operable to communicate results of the implementation to at least one of the other mobile production elements using the wireless transceiver;
a group identifier common to all of the mobile production elements; and
an individual identifier assigned to the production element individually,
wherein communications between the mobile production elements are implemented based on the group identifier and the individual identifiers.

40. The system of claim 39 wherein each mobile production element comprises a radio-frequency identification tag for implementing the group identifier and the individual identifiers.

* * * * *